(12) United States Patent
Morisaki

(10) Patent No.: US 10,737,582 B2
(45) Date of Patent: Aug. 11, 2020

(54) HYBRID VEHICLE, CONTROLLER FOR HYBRID VEHICLE, AND CONTROL METHOD FOR HYBRID VEHICLE

(71) Applicant: TOYOTA JIDOSHA KABUSHIKI KAISHA, Toyota-shi, Aichi-ken (JP)

(72) Inventor: Keisuke Morisaki, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/139,375

(22) Filed: Sep. 24, 2018

(65) Prior Publication Data

US 2019/0168616 A1 Jun. 6, 2019

(30) Foreign Application Priority Data

Dec. 5, 2017 (JP) ................. 2017-233643

(51) Int. Cl.
*B60L 53/22* (2019.01)
*B60W 10/08* (2006.01)
(Continued)

(52) U.S. Cl.
CPC ............... *B60L 53/22* (2019.02); *B60K 6/24* (2013.01); *B60K 6/28* (2013.01); *B60K 6/445* (2013.01); *B60L 58/12* (2019.02); *B60W 10/06* (2013.01); *B60W 10/08* (2013.01); *B60W 10/26* (2013.01); *B60W 20/12* (2016.01); *B60W 20/16* (2016.01); *B60W 30/194* (2013.01); *B60W 50/0097* (2013.01); *F02N 11/0818* (2013.01); *F02N 11/0829* (2013.01); *B60L 2240/423* (2013.01); *B60W 2520/10* (2013.01); *B60W 2530/14* (2013.01); *B60W 2530/18* (2013.01); *B60W 2540/10* (2013.01); *B60W 2540/30* (2013.01); *B60W 2552/15* (2020.02);
(Continued)

(58) Field of Classification Search
None
See application file for complete search history.

(56) References Cited

U.S. PATENT DOCUMENTS 9,291,469 B2 * 3/2016 Hoch ............... G08G 1/096866
2009/0012664 A1 * 1/2009 Christ ................. B60L 15/2045
701/22
(Continued)

FOREIGN PATENT DOCUMENTS

JP 2002-359904 A 12/2002
JP 2012-153257 A 8/2012
(Continued)

Primary Examiner — Shelley Chen
(74) Attorney, Agent, or Firm — Sughrue Mion, PLLC

(57) ABSTRACT

A hybrid vehicle includes an engine, a motor, a power storage device connected to the motor, and an electronic control unit. The electronic control unit executes power storage capacity decreasing control in a current trip and executes power storage capacity recovering control in a next trip when parking at a predetermined point is predicted. The electronic control unit limits execution of the power storage capacity decreasing control in the current trip when heavy-load traveling with a load heavier than a predetermined load is predicted to be performed within a predetermined period after the start of the next trip when the next trip is started at a predetermined point.

14 Claims, 12 Drawing Sheets

(51) Int. Cl.
  *B60W 20/12*    (2016.01)
  *B60K 6/24*     (2007.10)
  *B60K 6/28*     (2007.10)
  *B60W 50/00*    (2006.01)
  *B60L 58/12*    (2019.01)
  *F02N 11/08*    (2006.01)
  *B60K 6/445*    (2007.10)
  *B60W 10/06*    (2006.01)
  *B60W 10/26*    (2006.01)
  *B60W 20/16*    (2016.01)
  *B60W 30/194*   (2012.01)

(52) U.S. Cl.
  CPC ..... *B60W 2552/20* (2020.02); *B60W 2552/25* (2020.02); *B60W 2555/40* (2020.02); *B60W 2556/50* (2020.02); *B60W 2556/55* (2020.02); *B60W 2710/244* (2013.01); *F02N 2200/046* (2013.01); *F02N 2200/061* (2013.01); *F02N 2300/2011* (2013.01)

(56) References Cited

U.S. PATENT DOCUMENTS

| | | | |
|---|---|---|---|
| 2014/0052373 A1* | 2/2014 | Hoch | G08G 1/096822 701/533 |
| 2014/0203759 A1* | 7/2014 | Sugiyama | B60L 58/20 320/104 |
| 2015/0239365 A1* | 8/2015 | Hyde | B60L 50/30 701/2 |
| 2017/0120888 A1 | 5/2017 | Jinno | |

FOREIGN PATENT DOCUMENTS

JP  2012153257 A * 8/2012
JP  2017-081416 A   5/2017

* cited by examiner

HYBRID VEHICLE, CONTROLLER FOR HYBRID VEHICLE, AND CONTROL METHOD FOR HYBRID VEHICLE

INCORPORATION BY REFERENCE

The disclosure of Japanese Patent Application No. 2017-233643 filed on Dec. 5, 2017 including the specification, drawings and abstract is incorporated herein by reference in its entirety.

BACKGROUND

1. Technical Field

The disclosure relates to a hybrid vehicle, a controller for the hybrid vehicle, and a control method for the hybrid vehicle, and more particularly, to a hybrid vehicle including an engine, a motor, and a power storage device, a controller for the hybrid vehicle, and a control method for the hybrid vehicle.

2. Description of Related Art

A hybrid vehicle that includes an engine, a motor, and a battery and controls the engine and the motor such that the vehicle travels while a state of charge of the battery becomes a target state of charge has been proposed in which the target state of charge of the battery is changed from a basic target state of charge to a special target state of charge less than the basic target state of charge when the hybrid vehicle has reached a point a predetermined distance before a parking point (a destination) at which a parking duration is predicted to be longer than a predetermined period in a traveling route of the hybrid vehicle and the target state of charge is returned to the basic target state of charge when the hybrid vehicle restarts from the parking point in a next trip (for example, see Japanese Unexamined Patent Application Publication No. 2017-81416 (JP 2017-81416 A)). In such a hybrid vehicle, the state of charge of the battery at the time of restarting from the parking point can be set to be satisfactorily lower than the basic target state of charge (to the vicinity of the special target state of charge) through such control. Accordingly, at the time of engine running (cold running) additionally serving as warm-up, a load is applied to the engine to enhance charging (cold charging) efficiency of the battery.

SUMMARY

In this hybrid vehicle, the state of charge of the battery at the time of restarting from a parking point is set to be much lower than the basic target state of charge (set to the vicinity of the special target state of charge). Accordingly, when the hybrid vehicle performs heavy-load traveling with a heavy vehicle load relatively soon after the vehicle has restarted, the state of charge of the battery is low (an amount of dischargeable power is small) and thus there is a likelihood of a decrease in traveling performance being caused or there is a likelihood that a load on the engine will increase excessively for securing the traveling performance and the efficiency of the engine will decrease.

A hybrid vehicle, a controller for the hybrid vehicle, and a control method for the hybrid vehicle according to the disclosure can curb a decrease in traveling performance or a decrease in engine efficiency.

A first aspect of the disclosure provides a hybrid vehicle. The hybrid vehicle includes an engine, a motor, a power storage device that is connected to the motor, and an electronic control unit. The electronic control unit is configured to, i) when a condition a) is satisfied, execute power storage capacity decreasing control in a current trip and execute power storage capacity recovering control in a next trip, and ii) limit execution of the power storage capacity decreasing control in the current trip when the condition a) and a condition b) are both satisfied, a) parking at a predetermined point is predicted, and b) when the next trip is started at the predetermined point, heavy-load traveling with a load heavier than a predetermined load is predicted to be performed within a predetermined period after a start of the next trip. The power storage capacity decreasing control is control of controlling the engine and the motor such that a power storage capacity of the power storage device is lower when the condition a) is satisfied than when the condition a) is not satisfied. The power storage capacity recovering control is control of controlling the engine and the motor such that the power storage capacity of the power storage device is recovered when the engine operates. The predetermined period is at least one period of a period in which a predetermined time elapses and a period in which the hybrid vehicle travels a predetermined distance.

With this configuration, when the hybrid vehicle performs heavy-load traveling within a predetermined time or within a predetermined distance (relatively soon) after the start of the next trip, it is possible to curb a decrease in traveling performance and to curb a decrease in efficiency of the engine due to an excessive increase in the load on the engine for securing traveling performance. Here, the "predetermined time" or the "predetermined distance" may be a fixed time or a fixed distance, or may be a variable time or a variable distance. Here, "limiting of execution of the power storage capacity decreasing control" includes execution of second power storage capacity decreasing control of limiting an amount of decreased power storage capacity of the power storage device compared with the power storage capacity decreasing control and prohibition of execution of the power storage capacity decreasing control.

In the hybrid vehicle, the electronic control unit may be configured to prohibit execution of the power storage capacity decreasing control in the current trip when the condition a) and the condition b) are both satisfied. With this configuration, when the hybrid vehicle performs heavy-load traveling within a predetermined time or within a predetermined distance (relatively soon) after the start of the next trip, it is possible to satisfactorily curb a decrease in traveling performance and to curb a decrease in efficiency of the engine due to an excessive increase in the load on the engine for securing traveling performance.

In the hybrid vehicle, the electronic control unit may be configured to predict whether to perform the heavy-load traveling within the predetermined period after the start of the next trip at the predetermined point based on one of a condition c) and a condition d) when the condition a) is satisfied: c) the number of times the heavy-load traveling was performed within the predetermined period after the start of a previous trip when the previous trip was started at the predetermined point; and d) the number of times the heavy-load traveling was not performed within the predetermined period after the start of the previous trip when the previous trip was started at the predetermined point. With this configuration, based on previous histories, it is possible to predict whether to perform heavy-load traveling within a predetermined time or within a predetermined distance from the start of the next trip when the next trip is started at the predetermined point.

In the hybrid vehicle, the electronic control unit may be configured to determine whether the heavy-load traveling was performed within the predetermined period after the start of the trip based on at least one of a condition e), a condition f), a condition g), a condition h), and a condition j): e) one of an integrated value of an accelerator operation amount within the predetermined period after the start of the trip and a maximum value of the accelerator operation amount within the predetermined period after the start of the trip; f) one of an integrated value of a vehicle speed within the predetermined period after the start of the trip and a maximum value of the vehicle speed within the predetermined period after the start of the trip; g) one of an integrated value of a traveling output within the predetermined period after the start of the trip and a maximum value of the traveling output within the predetermined period after the start of the trip; h) one of an integrated value of a road gradient within the predetermined period after the start of the trip and a maximum value of the road gradient within the predetermined period after the start of the trip; and j) a difference in elevation within the predetermined period after the start of the trip. With this configuration, it is possible to determine whether heavy-load traveling has been performed within a predetermined time or within a predetermined distance from the start of the trip based on the integrated value of the accelerator operation amount within the predetermined time or within the predetermined distance from the start of the trip.

In the hybrid vehicle, the electronic control unit may be configured to predict whether to perform the heavy-load traveling within the predetermined period after the start of the next trip at the predetermined point based on at least one of presence of an uphill road, a road gradient, and a difference in elevation within the predetermined distance from the predetermined point when the condition a) is satisfied. With this configuration, based on an environment around the predetermined point, it is possible to predict whether to perform heavy-load traveling within the predetermined time or within the predetermined distance from the start of the next trip when the next trip is started at the predetermined point.

In the hybrid vehicle, the electronic control unit may be configured to notify with a message indicating limiting of execution of the power storage capacity decreasing control when condition k) is satisfied, k) execution of the power storage capacity decreasing control is scheduled to be limited. With this configuration, it is possible to enable a user to recognize that execution of the power storage capacity decreasing control is scheduled to be limited.

In the hybrid vehicle, the electronic control unit may be configured not to limit execution of the power storage capacity decreasing control in the current trip when the condition k) and a condition l) are both satisfied, l) rejection of limiting of execution of the power storage capacity decreasing control is instructed. With this configuration, it is possible to reflect a user's intention.

In the hybrid vehicle, the electronic control unit may be configured to determine whether parking at the predetermined point is predicted based on whether a destination is the predetermined point. The electronic control unit may be configured to acquire a destination that is predicted based on a traveling history by an external system when a destination has not been set by a user. With this configuration, even when a destination has not been set by a user, it is possible to determine whether parking at the predetermined point is predicted by acquiring a predicted destination form an external system (for example, a cloud server)

The hybrid vehicle may be a vehicle that is not able to use external charging. The external charging may be charging of the power storage device using electric power from an external power supply. The hybrid vehicle may be a vehicle that is able to use the external charging, and the predetermined point may be a position at which the vehicle is predicted not to use external charging. When external charging is performed during parking at the predetermined point, there is little necessity for execution of the power storage capacity decreasing control before parking at the predetermined point.

A second aspect of the disclosure provides a controller for a hybrid vehicle. The hybrid vehicle includes an engine, a motor, a power storage device that is connected to the motor, and an electronic control unit. The electronic control unit is configured to, i) when a condition a) is satisfied, execute power storage capacity decreasing control in a current trip and execute power storage capacity recovering control in a next trip, and ii) limit execution of the power storage capacity decreasing control in the current trip when the condition a) and a condition b) are both satisfied, a) parking at a predetermined point is predicted, and b) when the next trip is started at the predetermined point, heavy-load traveling with a load heavier than a predetermined load is predicted to be performed within a predetermined period after a start of the next trip. The power storage capacity decreasing control is control of controlling the engine and the motor such that a power storage capacity of the power storage device is lower when the condition a) is satisfied than when the condition a) is not satisfied. The power storage capacity recovering control is control of controlling the engine and the motor such that the power storage capacity of the power storage device is recovered when the engine operates. The predetermined period is at least one period of a period in which a predetermined time elapses and a period in which the hybrid vehicle travels a predetermined distance.

With this configuration, when the hybrid vehicle performs heavy-load traveling within a predetermined time or within a predetermined distance (relatively soon) after the start of the next trip, it is possible to curb a decrease in traveling performance and to curb a decrease in efficiency of the engine due to an excessive increase in the load on the engine for securing traveling performance. Here, the "predetermined time" or the "predetermined distance" may be a fixed time or a fixed distance, or may be a variable time or a variable distance. Here, "limiting of execution of the power storage capacity decreasing control" includes execution of second power storage capacity decreasing control of limiting an amount of decreased power storage capacity of the power storage device compared with the power storage capacity decreasing control and prohibition of execution of the power storage capacity decreasing control.

A third aspect of the disclosure provides a control method for a hybrid vehicle. The hybrid vehicle includes an engine, a motor, a power storage device that is connected to the motor, and an electronic control unit. The control method includes: causing the electronic control unit to, i) when a condition a) is satisfied, executing by the electronic control unit, power storage capacity decreasing control in a current trip and executing power storage capacity recovering control in a next trip, and ii) limiting execution of the power storage capacity decreasing control in the current trip when the condition a) and a condition b) are both satisfied, a) parking at a predetermined point is predicted, and b) when the next trip is started at the predetermined point, heavy-load traveling with a load heavier than a predetermined load is predicted to be performed within a predetermined period after a start of the next trip. The power storage capacity decreasing control is control of controlling the engine and the motor such that a power storage capacity of the power storage device is lower when the condition a) is satisfied than when the condition a) is not satisfied. The power storage capacity recovering control is control of controlling the engine and the motor such that the power storage capacity of the power storage device is recovered when the engine operates. The predetermined period is at least one period of a period in which a predetermined time elapses and a period in which the hybrid vehicle travels a predetermined distance.

With this configuration, when the hybrid vehicle performs heavy-load traveling within a predetermined time or within a predetermined distance (relatively soon) after the start of the next trip, it is possible to curb a decrease in traveling performance and to curb a decrease in efficiency of the engine due to an excessive increase in the load on the engine for securing traveling performance. Here, the "predetermined time" or the "predetermined distance" may be a fixed time or a fixed distance, or may be a variable time or a variable distance. Here, "limiting of execution of the power storage capacity decreasing control" includes execution of second power storage capacity decreasing control of limiting an amount of decreased power storage capacity of the power storage device compared with the power storage capacity decreasing control and prohibition of execution of the power storage capacity decreasing control.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described with reference to the accompanying drawings.

Figure 1:
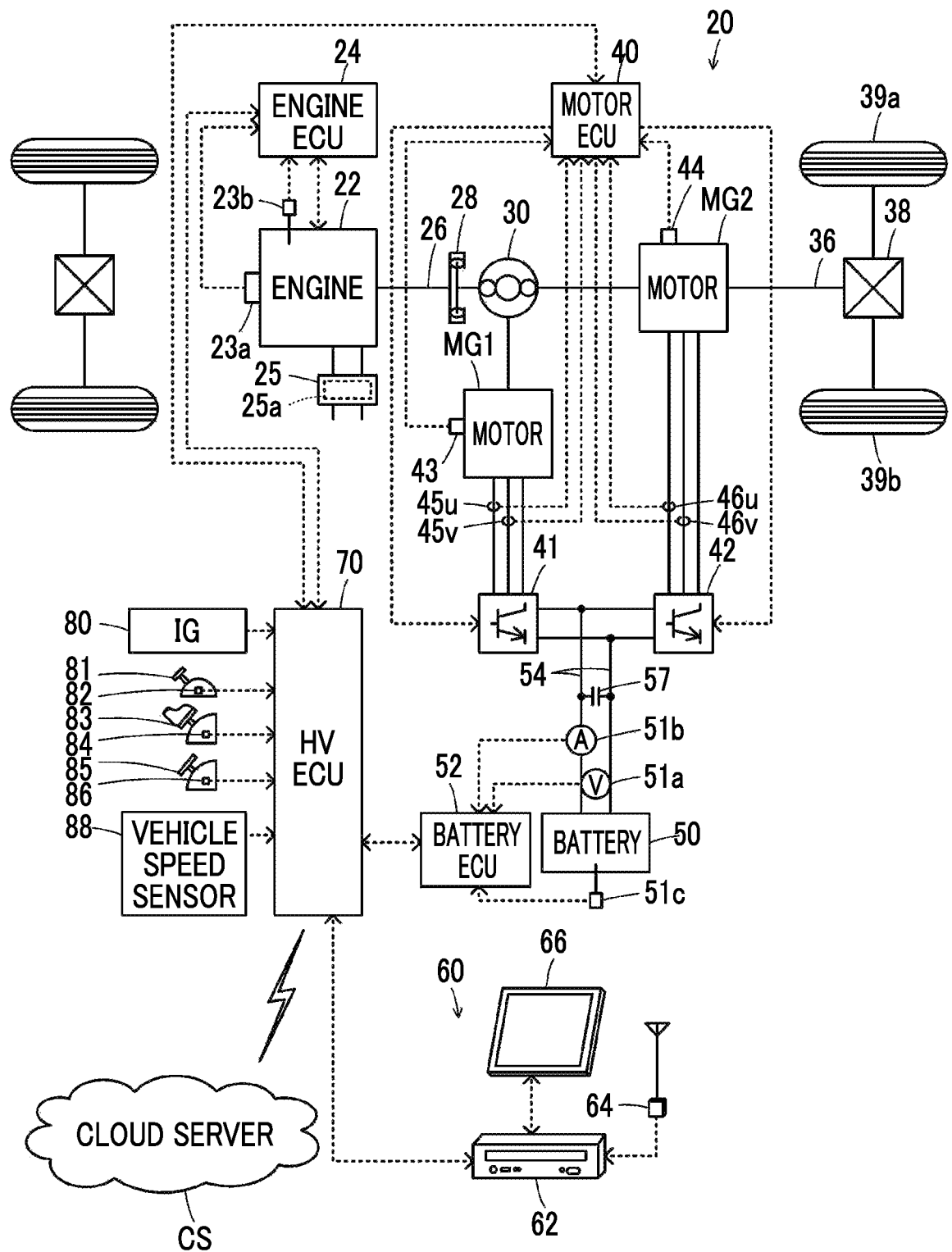
FIG. 1 is a diagram schematically illustrating a configuration of a hybrid vehicle 20 according to an embodiment of the invention.

FIG. 1 is a diagram schematically illustrating a configuration of a hybrid vehicle 20 according to an embodiment of the invention. As illustrated in the drawing, the hybrid vehicle 20 according to the embodiment includes an engine 22, a planetary gear 30, motors MG1 and MG2, inverters 41 and 42, a battery 50 as a power storage device, an onboard navigation device 60, and a hybrid electronic control unit (hereinafter referred to as an "HVECU") 70.

The engine 22 is configured as an internal combustion engine that outputs power using gasoline, diesel, or the like as fuel and is connected to a carrier of a planetary gear 30 via a damper 28. A purifier 25 including a catalyst 25a that purifies exhaust gas from the engine 22 is attached to an exhaust system of the engine 22. Operation of the engine 22 is controlled by an engine electronic control unit (hereinafter referred to as an "engine ECU") 24.

Although not illustrated in the drawing, the engine ECU 24 is configured as a microprocessor such as a CPU, and includes a ROM that stores a processing program, a RAM that temporarily stores data, input and output ports, and a communication port in addition to the CPU. Signals from various sensors which are required for controlling operation of the engine 22, for example, a crank angle $\theta cr$ from a crank position sensor 23a that detects a rotational position of a crank shaft 26 of the engine 22 and a coolant temperature Tw from a coolant temperature sensor 23b that detects a temperature of a coolant of the engine 22, are input to the engine ECU 24 via the input port. Various control signals for controlling operation of the engine 22 are output from the engine ECU 24 via the output port. The engine ECU 24 is connected to the HVECU 70 via the communication port. The engine ECU 24 calculates a rotation speed Ne of the engine 22 based on the crank angle $\theta cr$ from the crank position sensor 23a or estimates a temperature (a catalyst temperature) Tc of the catalyst 25a based on the coolant temperature Tw from the coolant temperature sensor 23b.

The planetary gear 30 is configured as a single pinion type planetary gear mechanism. A rotor of the motor MG1 is connected to a sun gear of the planetary gear 30. A drive shaft 36 connected to driving wheels 39a and 39b via a differential gear 38 is connected to a ring gear of the planetary gear 30. The crank shaft 26 of the engine 22 is connected to a carrier of the planetary gear 30 via the damper 28 as described above.

The motor MG1 is configured, for example as a synchronous generator motor and the rotor thereof is connected to the sun gear of the planetary gear 30 as described above. The motor MG2 is configured, for example as a synchronous generator motor and a rotor thereof is connected to the drive shaft 36. The inverters 41 and 42 are used to drive the motors MG1 and MG2 and are connected to the battery 50 via a power line 54. A smoothing capacitor 57 is attached to the power line 54. The motors MG1 and MG2 are rotationally driven by causing a motor electronic control unit (hereinafter referred to as a "motor ECU") 40 to control switching of a plurality of switching elements which is not illustrated in the inverters 41 and 42.

Although not illustrated in the drawing, the motor ECU 40 is configured as a microprocessor such as a CPU, and includes a ROM that stores a processing program, a RAM that temporarily stores data, input and output ports, and a communication port in addition to the CPU. Signals from various sensors which are required for controlling operation of the motors MG1 and MG2, for example, rotational positions θm1 and θm2 from rotational position sensors 43 and 44 that detect rotational positions of the rotors of the motors MG1 and MG2 and phase currents Iu1, Iv1, Iu2, and Iv2 from current sensors 45$u$, 45$v$, 46$u$, and 46$v$ that detect currents flowing by phases of the motors MG1 and MG2, are input to the motor ECU 40 via the input port. Switching control signals to a plurality of switching elements of the inverters 41 and 42 and the like are output from the motor ECU 40 via the output port. The motor ECU 40 is connected to the HVECU 70 via the communication port. The motor ECU 40 calculates electrical angles θe1 and θe2, angular velocities wm1 and wm2, or rotation speeds Nm1 and Nm2 of the motors MG1 and MG2 based on the rotational positions θm1 and θm2 of the rotors of the motors MG1 and MG2 from the rotational position sensors 43 and 44.

The battery 50 is configured, for example, as a lithium-ion secondary battery or a nickel-hydride secondary battery and is connected to the power line 54. The battery 50 is controlled by a battery electronic control unit (hereinafter referred to as a "battery ECU") 52.

Although not illustrated in the drawing, the battery ECU 52 is configured as a microprocessor such as a CPU, and includes a ROM that stores a processing program, a RAM that temporarily stores data, input and output ports, and a communication port in addition to the CPU. Signals from various sensors which are required for controlling the battery 50 are input to the battery ECU 52 via the input port. Examples of the signals input to the battery ECU 52 include a voltage Vb of the battery 50 from a voltage sensor 51$a$ that is attached between the terminals of the battery 50, a current Ib of the battery 50 from a current sensor 51$b$ that is attached to the output terminal of the battery 50, and a temperature Tb of the battery 50 from a temperature sensor 51$c$ that is attached to the battery 50. The battery ECU 52 is connected to the HVECU 70 via the communication port. The battery ECU 52 calculates a power storage capacity (state of charge) SOC based on an integrated value of the current Ib of the battery 50 from the current sensor 51$b$ or calculates input and output limits Win and Wout based on the calculated power storage capacity SOC and the temperature Tb of the battery 50 from the temperature sensor 51$c$. The power storage capacity SOC refers to a ratio of the capacity of electric power which can be discharged from the battery 50 to the total capacity of the battery 50. The input and output limits Win and Wout are allowable charging and discharging powers with which the battery 50 may be charged and discharged.

The onboard navigation device 60 includes a main body 62 that has a storage medium such as a hard disk in which map information or the like is stored or a control unit including input and output ports and a communication port built therein, a GPS antenna 64 that receives information on a current location of the vehicle, and a touch panel type display 66 that displays the information of the current location of the vehicle, a scheduled traveling route to a destination, or the like and can receive various instructions from a user. In the map information, service information (for example, sightseeing information or parking lots), road information of predetermined traveling sections (for example, signaling periods or distance between intersections), and the like are stored as a database. The road information includes distance information, road width information, lane number information, region information (downtown or outskirt), road type information (regular roads, expressways, or toll roads), gradient information, legal speed limits, and the number of signals. The onboard navigation device 60 is connected to the HVECU 70 via the communication port.

When the display 66 is operated to set a destination by a user, the onboard navigation device 60 sets a scheduled traveling route from a current location to a destination of the vehicle based on the map information and the current location and the destination of the vehicle, and displays the set scheduled traveling route on the display 66 to perform route guidance.

Although not illustrated in the drawing, the HVECU 70 is configured as a microprocessor such as a CPU, and includes a ROM that stores a processing program, a RAM that temporarily stores data, input and output ports, and a communication port in addition to the CPU. Signals from various sensors are input to the HVECU 70 via the input port. Examples of the signals input to the HVECU 70 include an ignition signal from an ignition switch 80 and a shift position SP from a shift position sensor 82 that detects an operation position of a shift lever 81. Examples thereof further include an accelerator operation amount Acc from an accelerator pedal position sensor 84 that detects an amount of depression of an accelerator pedal 83, a brake pedal position BP from a brake pedal position sensor 86 that detects an amount of depression of a brake pedal 85, and a vehicle speed V from a vehicle speed sensor 88. As described above, the HVECU 70 is connected to the engine ECU 24, the motor ECU 40, the battery ECU 52, and the onboard navigation device 60 via the communication port. The HVECU 70 is configured to communicate with the cloud server CS in a wireless manner.

The cloud server CS is configured to communicate with vehicles including the hybrid vehicle 20 and stores traveling history information of the vehicles. The traveling history information includes a parking position, a parking time, and a parking duration. In the following description, parking in which the parking duration is longer than a predetermined time T1 (for example, 5 hours, 6 hours, or 7 hours) is referred to as "long-term parking" and parking in which the parking duration is equal to or shorter than the predetermined time T1 is referred to as "short-term parking." A point at which the vehicle parked for a long term in a past trip is referred to as a "long-term parking point" and a point at which the vehicle parked for a short term in a past trip is referred to as a "short-term parking point." When a certain point corresponds to both the long-term parking point and the short-term parking point, the point may be set to the long-term parking point or the short-term parking point depending on a day of the week or a time line or may be set to the long-term parking point or the short-term parking point depending on an average parking duration or the like. The predetermined time T1 is determined, for example, as a period of time in which the engine 22 or the catalyst 25$a$ is sufficiently cooled, and a fixed period of time may be used or a period of time varying depending on the atmospheric temperature or the like may be used.

The cloud server CS predicts a destination (an arrival point) of the current trip from the long-term parking point or the short-term parking point based on the traveling history information or a start point of the trip (a departure point) for each vehicle. For example, when a departure point is point A (for example, home) before noon of weekdays, the cloud server CS predicts point B (for example, a company) as a destination. When a departure point is not point A after noon of weekdays or holidays, the cloud server CS predicts point A as a destination. When a departure point is point A after noon of week days or holidays, the cloud server CS is assumed not to predict a destination (to be unclear).

The hybrid vehicle 20 having the above-mentioned configuration travels in a hybrid traveling mode (HV traveling mode) in which the vehicle travels with the engine 22 operating and in an electric traveling mode (EV traveling mode) in which the vehicle travels with the engine 22 not operated.

Figure 2:
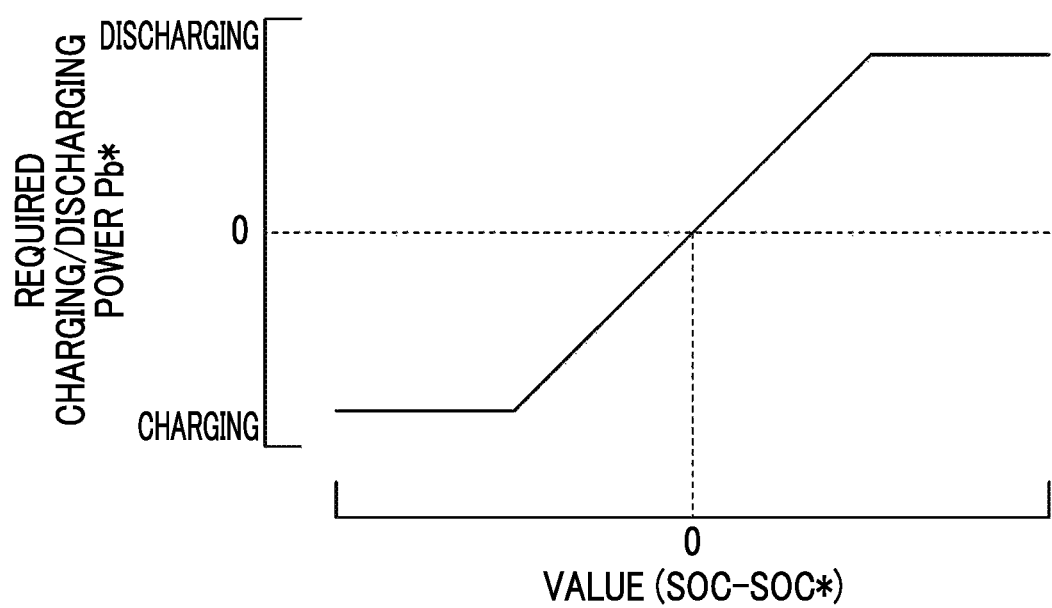
FIG. 2 is a diagram illustrating an example of a required charging/discharging power setting map.

In the HV traveling mode, the HVECU 70 sets a required torque Td* required for the drive shaft 36 based on the accelerator operation amount Acc and the vehicle speed V and calculates a required power Pd* required for the drive shaft 36 by multiplying the set required torque Td* by the rotation speed Nd of the drive shaft 36 (the rotation speed Nm2 of the motor MG2). Subsequently, the HVECU 70 sets a required charging/discharging power Pb* required for the battery 50 (which has a positive value when electric power is discharged from the battery 50) based on a power storage capacity SOC and a target capacity SOC* of the battery 50. The target capacity SOC* of the battery 50 is set by a target capacity setting routine which will be described later. The required charging/discharging power Pb* of the battery 50 is set such that a value (SOC-SOC*) obtained by subtracting the target capacity SOC* from the power storage capacity SOC of the battery 50 is close to zero (approaches zero). FIG. 2 is a diagram illustrating an example of a required charging/discharging power setting map. As illustrated in the drawing, the required charging/discharging power Pb* of the battery 50 is set to zero when the value (SOC-SOC*) is zero, is set to a value of which the absolute value increases within a positive range (within a discharging-side range) as the value (SOC-SOC*) increases when the value (SOC-SOC*) is positive, and is set to a value of which the absolute value increases within a negative range (within a charging-side range) as the value (SOC-SOC*) decreases when the value (SOC-SOC*) is negative.

Then, the HVECU 70 sets a required power Pe* required for the engine 22 by subtracting the required charging/discharging power Pb* of the battery 50 from the required power Pd*, and sets a target rotation speed Ne* or a target torque Te* of the engine 22 and torque commands Tm1* and Tm2* of the motors MG1 and MG2 such that the required power Pe* is output from the engine 22 and the required torque Td* is output to the drive shaft 36 within the range of the input and output limits Win and Wout of the battery 50. Subsequently, the HVECU 70 transmits the target rotation speed Ne* or the target torque Te* of the engine 22 to the engine ECU 24 and transmits the torque commands Tm1* and Tm2* of the motors MG1 and MG2 to the motor ECU 40. When the target rotation speed Ne* and the target torque Te* of the engine 22 are received, the engine ECU 24 performs operation control of the engine 22 (intake air control, fuel injection control, ignition control, and the like) such that the engine 22 operates based on the target rotation speed Ne* and the target torque Te*. When the torque command Tm1* and Tm2* of the motors MG1 and MG2 are received, the motor ECU 40 performs switching control of the switching elements of the inverters 41 and 42 such that the motors MG1 and MG2 operate in accordance with the torque commands Tm1* and Tm2*.

In the HV traveling mode, when all of a condition that the required power Pe* is less than a stopping threshold value Pstop, a condition that a warm-up request for the engine 22 or a warm-up request for the catalyst 25a is not issued, and a condition that a heating request for a passenger compartment with the engine 22 as a heat source is not issued have been satisfied, the HVECU 70 determines that a stopping condition of the engine 22 has been satisfied, and stops operation of the engine 22 to transition to the EV traveling mode. The warm-up request for the engine 22 is issued when the coolant temperature Tw of the engine 22 is less than a predetermined temperature Twref (for example, 70° C., 75° C., or 80° C.), and the warm-up request for the catalyst 25a is issued when a temperature (a catalyst temperature) Tc of the catalyst 25a is less than a predetermined temperature Tcref (for example, 350° C., 400° C., or 450° C.).

In the EV traveling mode, the HVECU 70 sets the required torque Td* required for the drive shaft 36 based on the accelerator operation amount Acc and the vehicle speed V, sets the torque command Tm1* of the motor MG1 to a value of 0, sets the torque command Tm2* of the motor MG2 such that the required torque Td* is output to the drive shaft 36 within the range of the input and output limits Win and Wout of the battery 50, and transmits the torque commands Tm1* and Tm2* of the motors MG1 and MG2 to the motor ECU 40. Control of the inverters 41 and 42 by the motor ECU 40 is the same as described above.

In the EV traveling mode, when at least one of a condition that the required power Pe* which is calculated in the same way as in the HV traveling mode is equal to or greater than a starting threshold value Pstart, a condition that a warm-up request for the engine 22 or a warm-up request for the catalyst 25a is issued, and a condition that a heating request for a passenger compartment is issued has been satisfied, the HVECU 70 determines that a starting condition of the engine 22 has been satisfied, and starts the engine 22 to transition to the HV traveling mode. In order to prevent starting and stopping of the engine 22 from being frequently performed for a short time, it is preferable that a value which is greater by a margin (for example, several kW) than the stopping threshold value Pstop be used as the starting threshold value Pstart.

Figure 3:
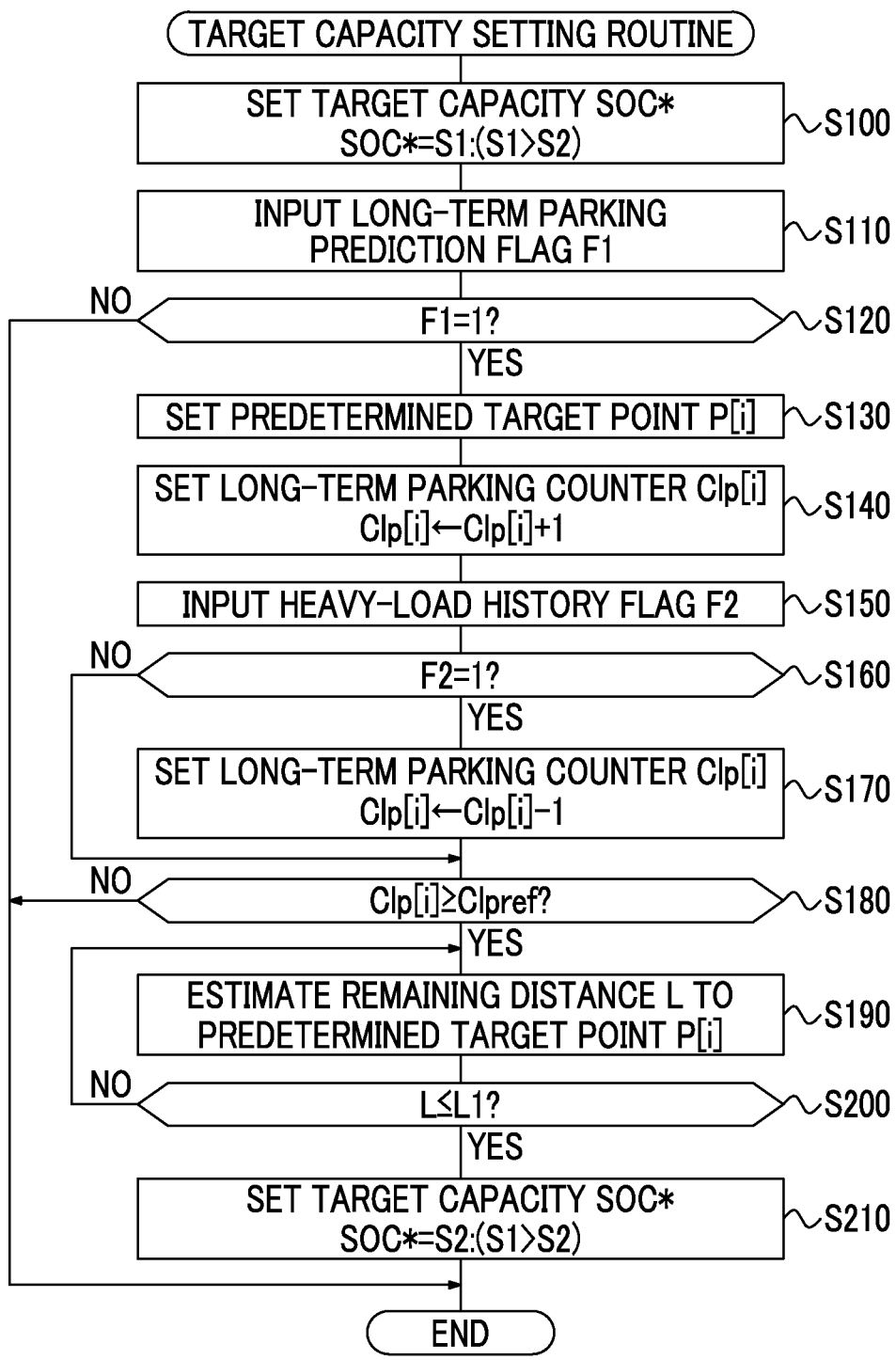
FIG. 3 is a flowchart illustrating an example of a target capacity setting routine which is performed by an HVECU 70.

Operations of the hybrid vehicle 20 according to the embodiment having the above-mentioned configuration, particularly, processes for setting the target capacity SOC* of the battery 50, will be described below. FIG. 3 is a flowchart illustrating an example of a target capacity setting routine which is performed by the HVECU 70. This routine is performed when a trip starts (when the ignition switch 80 is turned on).

When the target capacity setting routine illustrated in FIG. 3 is performed, the HVECU 70 sets the target capacity SOC* of the battery 50 to a predetermined value S1 (Step S100). For example, 58%, 60%, or 62% is used as the predetermined value S1.

Subsequently, the HVECU 70 sets a long-term parking prediction flag F1 (Step S110) and checks the set value of the long-term parking prediction flag F1 (Step S120). Here, the long-term parking prediction flag F1 is set to 1 when long-term parking at a predetermined point is predicted, and is set to 0 when long-term parking at the predetermined point is not predicted. The "predetermined point" is a point at which there is a likelihood of long-term parking, and examples thereof include the home, a company, a shopping mall, a leisure facility, and a lodging facility. The "predetermined point" includes a point which is set (registered) in advance before shipment of the vehicle, a point which is set (registered) by causing a user to operate the display 66, or a long-term parking point which is input from the cloud server CS by wireless communication.

Determination of whether long-term parking at a predetermined point is predicted can be performed as follows. When a destination has been set by a user, it can be performed by determining whether the set destination is included in the predetermined point or whether a scheduled arrival time to the set destination is included in the day or the time line in which the long-term parking is predicted. On the other hand, when a destination has not been set by a user, it can be determined by determining whether a destination has been predicted by the cloud server CS, whether the predicted destination is included in the predetermined point, or whether a scheduled arrival time to the predicted destination included in the day or the time line in which the long-term parking is predicted. Since a certain period of time is required from a time point at which a trip starts to a time point at which destination is set by a user, the process of Step S110 may be performed when a destination has been set by a user, when a certain period of time has elapsed, or when the vehicle has traveled a certain distance after the process of Step S100 has been performed.

When it is checked in Step S120 that value of the long-term parking prediction flag F1 is 0, the HVECU 70 determines that long-term parking at the predetermined point is not predicted, and ends this routine. In this case, the target capacity SOC* of the battery 50 is maintained at the predetermined value S1 until the current trip ends.

When it is checked in Step S120 that the value of the long-term parking prediction flag F1 is 1, the HVECU 70 determines that long-term parking at the predetermined point is predicted, sets the destination set by the user or the destination predicted by the cloud server CS as a predetermined target point P[i] (Step S130), and increases a long-term parking counter Clp[i] corresponding to the predetermined target point P[i] by 1 (Step S140). Here, [i] is a number corresponding to the home, the company, the shopping mall, the leisure facility, the lodging facility, or the like. The long-term parking counter Clp[i] is set to 0 as an initial value at the time of shipment from a factory.

Subsequently, a heavy-load history flag F2 is input (Step S150). Here, the heavy-load history flag F2 is set to 1 when heavy-load traveling with a load heavier than a predetermined load has been performed within a predetermined time T2 (for example, several minutes) from a start of a trip in an immediately previous trip which has been started at the predetermined target point P[i], and is set to 0 when heavy-load traveling has not been performed. The heavy-load history flag F2 is set through a heavy-load history flag setting routine illustrated in FIG. 4. Description of the target capacity setting routine illustrated in FIG. 3 will be stopped now and the heavy-load history flag setting routine illustrated in FIG. 4 will be described instead.

Figure 4:
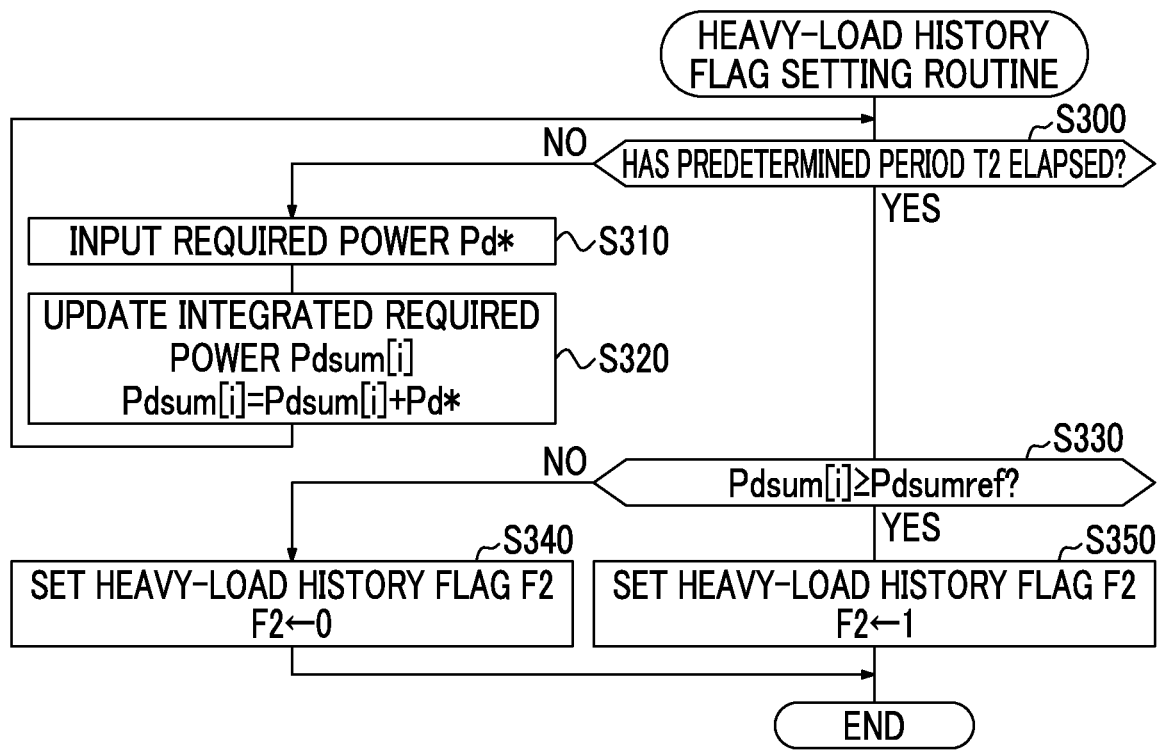
FIG. 4 is a flowchart illustrating an example of a heavy-load history flag setting routine which is performed by the HVECU 70.

The heavy-load history flag setting routine illustrated in FIG. 4 is performed when a trip is started at the predetermined target point P[i]. When this routine is performed, the HVECU 70 determines whether the predetermined time T2 has elapsed after the start of the trip (Step S300), receives a required power Pd* when the predetermined time T2 has not elapsed (Step S310), adds the required power Pd* to an integrated required power Pdsum[i] as an integrated value of the required power Pd* after the start of the trip to update the integrated required power Pdsum[i] (Step S320), and returns to Step S300. Here, as the required power Pd*, a value obtained by multiplying a required torque Td* based on the accelerator operation amount Acc and the vehicle speed V by the rotation speed Nd of the drive shaft 36 is input in the HV traveling mode, and a value 0 is input in the EV traveling mode.

The processes of Steps S300 to S320 are repeatedly performed in this way, and the integrated required power Pdsum[i] is compared with a threshold value Pdsumref (Step S330) when it is determined in Step S320 that the predetermined time T2 has elapsed after the start of the trip. The integrated required power Pdsum[i] at that time corresponds to an integrated value of the required power Pd* within the predetermined time T2 after the start of the trip. The threshold value Pdsumref is a threshold value which is used to determine whether heavy-load traveling has been performed within the predetermined time T2 after the start of the trip. As the threshold value Pdsumref, a fixed value may be used for the predetermined points or different values may be used for the predetermined points.

When it is determined in Step S330 that the integrated required power Pdsum[i] is less than the threshold value Pdsumref, the HVECU 70 determines that heavy-load traveling has not been performed within the predetermined time T2 after the start of the trip, sets the heavy-load history flag F2 to 0 (Step S340), and ends this routine. On the other hand, when it is determined in Step S330 that the integrated required power Pdsum[i] is equal to or greater than the threshold value Pdsumref, the HVECU 70 determines that heavy-load traveling has been performed within the predetermined time T2 after the start of the trip, sets the heavy-load history flag F2 to 1 (Step S350), and ends this routine.

The heavy-load history flag setting routine illustrated in FIG. 4 has been described above. The target capacity setting routine illustrated in FIG. 3 will be described again. When the heavy-load history flag F2 is input in Step S150, the HVECU 70 checks the value of the input heavy-load history flag F2 (Step S160). When the value of the heavy-load history flag F2 is 1, the HVECU 70 determines that heavy-load traveling has been performed within the predetermined time T2 after the start of the trip in an immediately previous trip which has been started at the predetermined target point P[i], and decreases the long-term parking counter Clp[i] corresponding to the predetermined target point P[i] by 1 (Step S170). On the other hand, when the value of the heavy-load history flag F2 is 0, the HVECU 70 determines that heavy-load traveling has not been performed within the predetermined time T2 after the start of the trip in the immediately previous trip which has been started at the predetermined target point P[i] and does not decrease but maintains the long-term parking counter Clp[i] (the process of Step S170 is not performed).

Accordingly, when long-term parking at a predetermined point (the predetermined target point P[i]) is predicted and heavy-load traveling is not performed within the predetermined time T2 after the start of a trip in the immediately previous trip which has been started at the predetermined target point P[i]. The value of the long-term parking counter Clp[i] corresponding to the predetermined target point P[i] is increased by 1. When heavy-load traveling has been performed within the predetermined time T2 after the start of a trip in the immediately previous trip which has been started at the predetermined target point P[i], the value of the long-term parking counter Clp[i] is maintained (is not increased).

Then, the long-term parking counter Clp[i] corresponding to the predetermined target point P[i] is compared with a threshold value Clpref (Step S180). Here, the threshold value Clpref is a threshold value which is used to predict (determine) whether heavy-load traveling is to be performed within the predetermined time T2 after the start of a trip when a next trip is started at the predetermined target point P[i], and, for example, 3, 4, or 5 is used. As the threshold value Clpref, the same value may be used for the predetermined points, or different values may be used for the predetermined points.

When it is determined in Step S180 that the value of the long-term parking counter Clp[i] corresponding to the predetermined target point P[i] is equal to or greater than the threshold value Clpref, the HVECU 70 predicts (determines) that heavy-load traveling is not performed within the predetermined time T2 after the start of a trip even when a next trip is started at the predetermined target point P[i], estimates a remaining distance L to the predetermined target point P[i] based on a current position, a destination, and map information (Step S190), compares the estimated remaining distance L with a predetermined distance L1 (for example, 3 km, 4 km, or 5 km) (Step S200), and returns this routine to Step S190 when the remaining distance L is greater than the predetermined distance L1. The HVECU 70 repeatedly performs the processes of Steps S190 and S200 in this way and waits for until the remaining distance L to the predetermined target point P[i] reaches the predetermined distance L1.

When it is determined in Step S200 that the remaining distance L to the predetermined target point P[i] becomes equal to or less than the predetermined distance L1, the HVECU 70 sets the target capacity SOC* of the battery 50 to a predetermined value S2 which is less than the predetermined value S1 (Step S210) and then ends this routine. For example, 48%, 50%, or 52% is used as the predetermined value S2.

In this case, when the remaining distance L to the predetermined target point P[i] becomes equal to or less than the predetermined distance L1 in the current trip, power storage capacity decreasing control of decreasing the power storage capacity SOC of the battery 50 is performed by changing the target capacity SOC* of the battery 50 from the predetermined value S1 to the predetermined value S2. Power storage capacity recovering control of recovering the power storage capacity SOC of the battery 50 is performed in the next trip by setting the target capacity SOC* of the battery 50 to the predetermined value S1 at the time of starting of the next trip. Here, "power storage capacity decreasing control" is specifically control of controlling the engine 22 or the motors MG1 and MG2 such that the power storage capacity SOC of the battery 50 gets close to the predetermined value S2. "Power storage capacity recovering control" is specifically control of controlling the engine 22 or the motors MG1 and MG2 such that the power storage capacity SOC of the battery 50 gets close to the predetermined value S1 after the power storage capacity recovering control has been executed (in the next trip).

The power storage capacity SOC of the battery 50 at the time of ending of the current trip or at the time of starting of the next trip can be set to be lower (to get close to the predetermined value S2) by executing the power storage capacity decreasing control in the current trip in comparison with a case in which the power storage capacity decreasing control is not executed. Then, in comparison with a case in which the power storage capacity decreasing control is not executed and thus the power storage capacity SOC of the battery 50 is high (close to the predetermined value S1), the required charging/discharging power Pb* of the battery 50 can be decreased (a charging-side value can be increased) to increase the required power Pe*, that is, the output of the engine 22, by executing the power storage capacity recovering control in the next trip when the engine 22 operates in response to a heating request for the passenger compartment, a warm-up request for the engine 22, a warm-up request for the catalyst 25a, or the like. Accordingly, it is possible to charge the battery 50 while operating the engine 22 at an efficient operating point, securing a sufficient amount of heat for heating, or accelerating warm-up of the engine 22 or warm-up of the catalyst 25a. As a result, it is possible to achieve improvement in energy efficiency.

When it is determined in Step S180 that the long-term parking counter Clp[i] corresponding to the predetermined target point P[i] is less than the threshold value Clpref, the HVECU 70 predicts (determines) that heavy-load traveling is performed within the predetermined time T2 after the start of a trip when the next trip is started at the predetermined target point P[i], does not perform the processes of Steps S190 to S210, and ends this routine. In this case, the target capacity SOC* of the battery 50 is maintained at the predetermined value S1 until the current trip ends. That is, the power storage capacity decreasing control is not executed in the current trip (the power storage capacity recovering control is also not executed in the next trip).

When the power storage capacity decreasing control is executed in the current trip, the power storage capacity SOC of the battery 50 at the time of ending of the current trip or at the time of starting of the next trip is less than the predetermined value S1 (close to the predetermined value S2). Accordingly, when heavy-load traveling is performed within the predetermined time T2 from (relatively after) the start of the next trip, the power storage capacity SOC of the battery 50 is low (an amount of dischargeable power is small) and thus there is a likelihood of a decrease in traveling performance being caused or there is a likelihood that a load on the engine 22 will increase excessively for securing the traveling performance and the efficiency of the engine 22 will decrease. On the other hand, in this embodiment, when long-term parking at a predetermined point (the predetermined target point P[i]) is predicated in the current trip and heavy-load traveling is predicted to be performed within the predetermined time T2 after the start of a trip when the next trip is started at the predetermined target point P[i], the long-term parking counter Clp[i] is maintained (is not increased). When the long-term parking counter Clp[i] is less than the threshold value Clpref, the power storage capacity decreasing control is not executed in the current trip. Accordingly, when heavy-load traveling is performed within the predetermined time T2 from (relatively after) the start of the next trip, the power storage capacity SOC of the battery 50 is high (an amount of dischargeable power is large) and thus it is possible to curb a decrease in traveling performance and to prevent a load on the engine 22 from increasing excessively for securing the traveling performance to decrease the efficiency of the engine 22.

Figure 5:
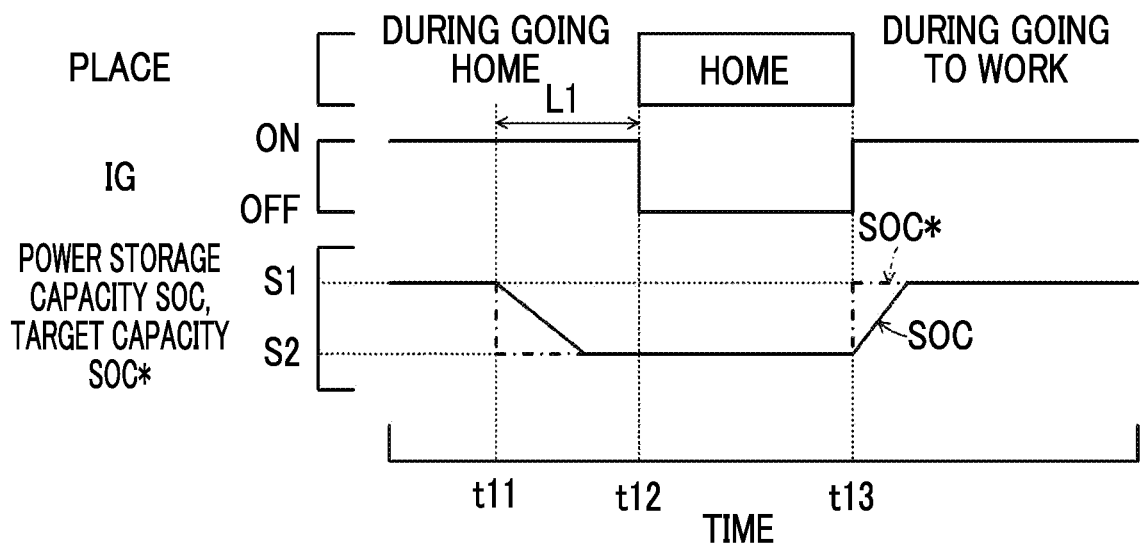
FIG. 5 is a diagram illustrating an example of a state in which the hybrid vehicle travels from a company to the home and travels from the home to the company on the next day.
Figure 6:
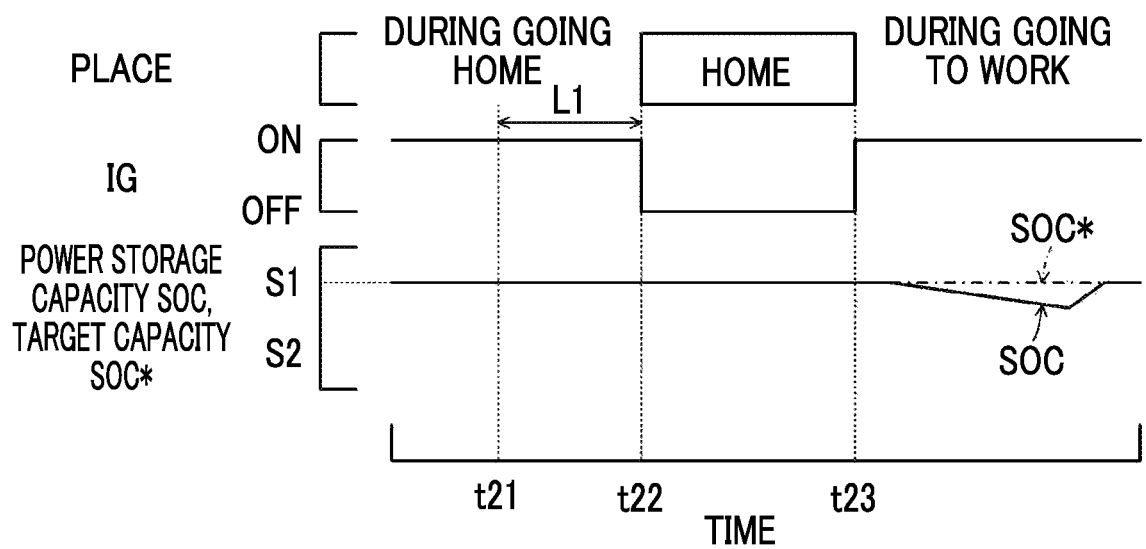
FIG. 6 is a diagram illustrating an example of a state in which the hybrid vehicle travels from the company to the home and travels from the home to the company on the next day.

FIGS. 5 and 6 are diagrams illustrating an example of a state in which the hybrid vehicle travels from a company to the home and travels from the home to the company on the next day. FIG. 5 illustrates a state in which heavy-load traveling is predicted not to be performed within the predetermined time T2 after the start of a trip even when the next trip is started at the predetermined target point P[i]. FIG. 6 illustrates a state in which heavy-load traveling is predicted to be performed within the predetermined time T2 after the start of a trip even when the next trip is started at the predetermined target point P[i]. In FIGS. 5 and 6, it is assumed that the home is set (registered) as the predetermined point.

In FIG. 5, as execution of the power storage capacity decreasing control, the engine 22 or the motors MG1 and MG2 are controlled such that the power storage capacity SOC of the battery 50 gets close to the predetermined value S2 less than the predetermined value S1 until the vehicle arrives at home after the remaining distance L to the predetermined target point P[i] becomes equal to or less than the predetermined distance L1 (from time t11 to time t12) during traveling from the company to the home. At the time of traveling from the home on the next day (from time t13), the engine 22 or the motors MG1 and MG2 are controlled such that the power storage capacity SOC of the battery 50 gets close to the predetermined value S1 as execution of the power storage capacity recovering control. Accordingly, at the time of traveling from the home, it is possible to increase the output of the engine 22 when the engine 22 operates in response to a heating request for the passenger compartment, a warm-up request for the engine 22, a warm-up request for the catalyst 25a, or the like. Accordingly, it is possible to charge the battery 50 while operating the engine 22 at an efficient operating point, securing a sufficient amount of heat for heating, or accelerating warm-up of the engine 22 or warm-up of the catalyst 25a. As a result, it is possible to achieve an improvement in energy efficiency.

In FIG. 6, during traveling from the company to the home, the power storage capacity decreasing control is not executed even when the remaining distance L to the predetermined target point P[i] becomes equal to or less than the predetermined distance L1 (time t21). The vehicle arrives at the home (time t22), and when heavy-load traveling is performed at the time of traveling from the home on the next day (from time t23), the power storage capacity SOC of the battery 50 decreases (temporarily) by using electric power from the battery 50 for traveling. In this case, by not executing the power storage capacity decreasing control during traveling from the company to the home, it is possible to curb a decrease in traveling performance and to prevent a load on the engine 22 from increasing excessively for securing the traveling performance to decrease the efficiency of the engine 22, when heavy-load traveling is performed within the predetermined time T2 from (relatively after) the start of a trip at the time of traveling from the home. The case illustrated in FIG. 6 is likely to occur when an uphill road is present in the vicinity of the home, or the like.

In the hybrid vehicle 20 according to this embodiment, when long-term parking at the predetermined target point P[i] is predicted and heavy-load traveling is predicted not to be performed within the predetermined time T2 after the start of a trip even when a next trip is started at the predetermined target point P[i], the power storage capacity decreasing control is executed in the current trip and the power storage capacity recovering control is executed in the next trip. Accordingly, it is possible to achieve an improvement in energy efficiency. On the other hand, when long-term parking at the predetermined target point P[i] is predicted and heavy-load traveling is predicted to be performed within the predetermined time T2 after the start of a trip when a next trip is started at the predetermined target point P[i], the power storage capacity decreasing control is not executed in the current trip (the power storage capacity recovering control is also not executed in the next trip). Accordingly, when heavy-load traveling is performed within the predetermined time T2 from (relatively after) the start of the next trip, it is possible to curb a decrease in traveling performance and to prevent a load on the engine 22 from increasing excessively for securing the traveling performance to decrease the efficiency of the engine 22.

In the hybrid vehicle 20 according to this embodiment, when a trip is started at the predetermined target point P[i], it is determined whether heavy-load traveling has been performed within the predetermined time T2 (for example, several minutes) after the start of the trip and the heavy-load history flag F2 is set. However, when a trip is started at the predetermined target point P[i], it may be determined whether heavy-load traveling has been performed until the vehicle travels a predetermined distance L2 (for example, several km) from the start of the trip, and the heavy-load history flag F2 may be set. The predetermined time T2 or the predetermined distance L2 is not limited to a fixed period or a fixed time, but may be a variable period or a variable time.

In the hybrid vehicle 20 according to this embodiment, when a trip is started at the predetermined target point P[i], it is determined whether heavy-load traveling has been performed within the predetermined time T2 after the start of the trip and the heavy-load history flag F2 is set based on the integrated value of the required power Pd* (the integrated required power Pdsum[i]) within the predetermined time T2 after the start of the trip. However, when a trip is started at the predetermined target point P[i], it may be determined whether heavy-load traveling has been performed within the predetermined time T2 after the start of the trip and the heavy-load history flag F2 may be set based on at least one of an integrated value or a maximum value of the accelerator operation amount Acc, an integrated value or a maximum value of the vehicle speed V, an integrated value or a maximum value of the required torque Td* of the drive shaft 36, a maximum value of the required power Pd* of the drive shaft 36, an integrated value or a maximum value of a road gradient θd, and a difference in elevation ΔH within the predetermined time T2 after the start of the trip instead of or in addition to the integrated required power Pdsum[i]. Here, a value detected by the accelerator pedal position sensor 84 or the vehicle speed sensor 88 is used as the accelerator operation amount Acc or the vehicle speed V. A value set based on the accelerator operation amount Acc and the vehicle speed V is used as the required torque Td* or the required power Pd*. A value acquired from map information of the onboard navigation device 60 or a value detected by a gradient sensor (not illustrated) is used as the road gradient θd. The difference in elevation ΔH is a difference between a maximum value and a minimum value of an elevation H or a difference between a maximum value of the elevation H and the elevation H at the predetermined target point P[i], and a value acquired from the map information of the onboard navigation device 60 or a value calculated based on a value detected by an atmospheric pressure sensor (not illustrated) is used. For example, when at least one of a condition that the integrated value of the accelerator operation amount Acc is equal to or greater than a threshold value Asumref, a condition that the maximum value of the accelerator operation amount Acc is equal to or greater than a threshold value Amaxref, a condition that the integrated value of the vehicle speed is equal to or greater than a threshold value Vsumref, a condition that the maximum value of the vehicle speed V is equal to or greater than a threshold value Vmaxref, a condition that the integrated value of the required torque Td* is equal to or greater than a threshold value Tdsumref, a condition that the maximum value of the required torque Td* is equal to or greater than a threshold value Tdmaxref, a condition that the integrated value of the required power Pd* (the integrated required power Pdsum[i]) is equal to or greater than a threshold value Pdsumref, a condition that the maximum value of the required power Pd* is equal to or greater than a threshold value Pdmaxref, a condition that the integrated value of the road gradient θd is equal to or greater than a threshold value θdsumref, a condition that the maximum value of the road gradient θd is equal to or greater than a threshold value θdmaxref, and a condition that the difference in elevation ΔH is equal to or greater than a threshold value ΔHref, it may be determined that heavy-load traveling has been performed within the predetermined time T2 after the start of a trip and the heavy-load history flag F2 may be set to 1. As the determination data such as the integrated required power Pdsum[i] or the integrated value of the accelerator operation amount Acc which is used to determine whether heavy-load traveling has been performed within the predetermined time T2 after the start of a trip, a value when the vehicle traveled in the past, which is stored in the HVECU 70 or the cloud server CS, may be used, or values when other vehicles traveled, which are stored in the cloud server CS, may be used in addition thereto. The threshold values can be appropriately set.

In the hybrid vehicle 20 according to this embodiment, when long-term parking at the predetermined target point P[i] is predicted and, the long-term parking counter Clp[i] is set in consideration of the heavy-load history flag F2. However, the long-term parking counter Clp[i] may be set in consideration of a heavy-load traveling environment flag F3 instead of the heavy-load history flag F2. Here, the heavy-load traveling environment flag F3 is set to 1 when there is an environment in which heavy-load traveling can be easily performed within a predetermined distance L3 (for example, several km) from the predetermined target point P[i], and is set to 0 when there is no environment in which heavy-load traveling can be easily performed. Examples of the environment in which heavy-load traveling can be easily performed include an environment in which there is a an uphill road, an environment in which the maximum value of the road gradient θd is equal to or greater than the threshold value θdmaxref, and an environment in which the difference in elevation ΔH is equal to or greater than the threshold value ΔHref. By setting the long-term parking counter Clp[i] in consideration of the heavy-load traveling environment flag F3, it is possible to predict whether heavy-load traveling is to be performed within the predetermined time T2 after the start of a trip when a next trip is started at the predetermined target point P[i] based on the environment around the predetermined target point P[i].

Figure 7:
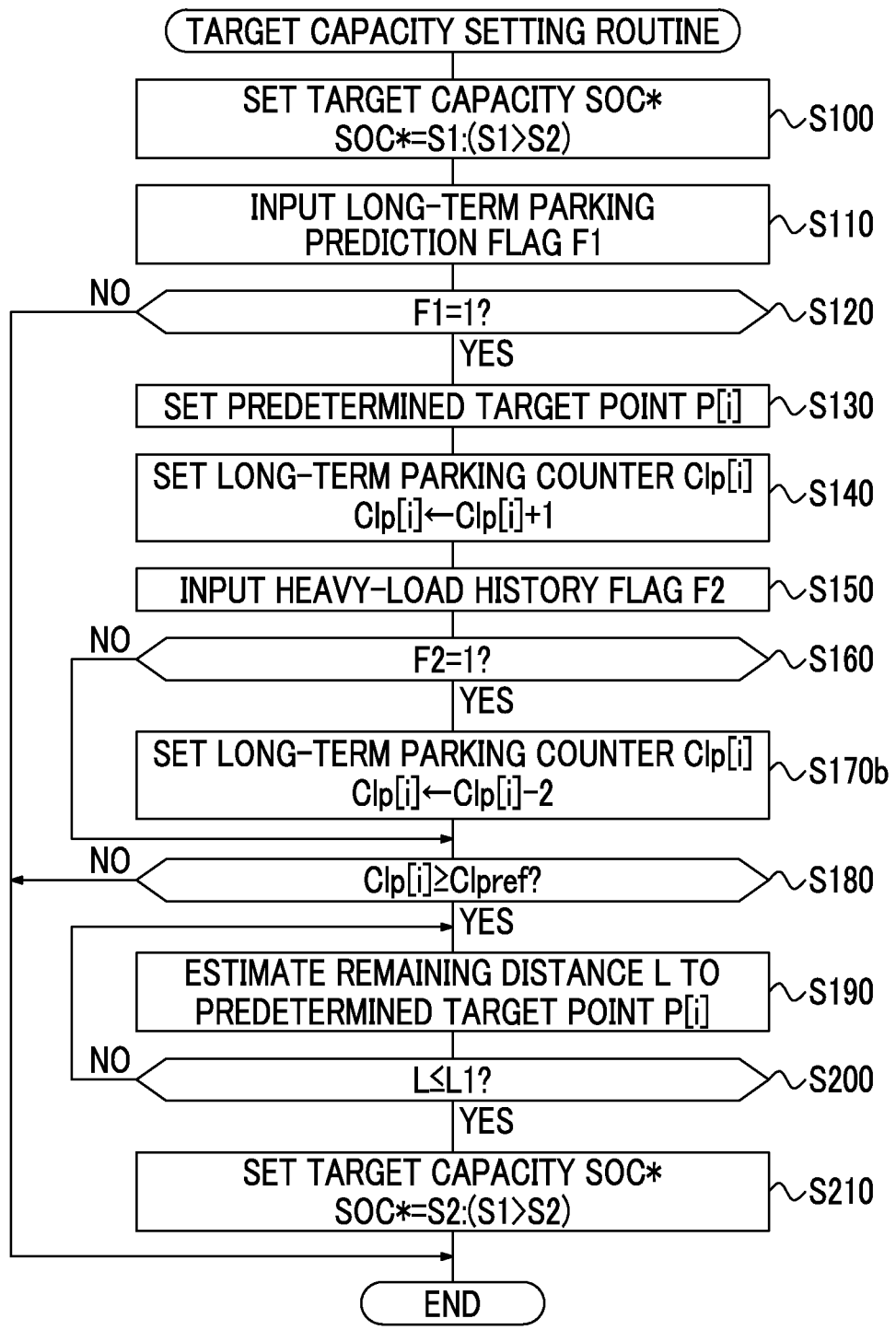
FIG. 7 is a flowchart illustrating an example of a target capacity setting routine according to a modified example.

In the hybrid vehicle 20 according to this embodiment, the HVECU 70 performs the target capacity setting routine illustrated in FIG. 3, but may perform a target capacity setting routine illustrated in FIG. 7 instead thereof. The target capacity setting routine illustrated in FIG. 7 is the same as the target capacity setting routine illustrated in FIG. 3, except that the process of Step S170b is performed instead of the process of Step S170. Accordingly, the same processes will be referred to by the same step numbers and detailed description thereof will be omitted.

In the target capacity setting routine illustrated in FIG. 7, when it is determined in Step S120 that the value of the long-term parking prediction flag F1 is 1, the value of the long-term parking counter Clp[i] corresponding to the predetermined target point P[i] is increased by 1 in Step S140, and it is determined in Step S160 that the value of the heavy-load history flag F2 is 1, the HVECU 70 determines that heavy-load traveling has been performed within the predetermined time T2 after the start of a trip in an immediately previous trip which has been started at the predetermined target point P[i] and decreases the long-term parking counter Clp[i] corresponding to the predetermined target point P[i] by 2 (Step S170b). Then, the processes of Step S180 and steps subsequent thereto are performed.

That is, when long-term parking at the predetermined point (the predetermined target point P[i]) is predicted and heavy-load traveling is not performed within the predetermined time T2 after the start of a trip in an immediately previous trip which has been started at the predetermined target point P[i], the long-term parking counter Clp[i] is maintained (is not increased) in the embodiment, but the value of the long-term parking counter Clp[i] is decreased by 1 in the modified example. Accordingly, as the number of times of the frequency in which heavy-load traveling was performed within the predetermined time T2 after the start of a trip when the previous trip was started at the predetermined target point P[i] becomes larger, the long-term parking counter Clp[i] is set to a smaller value and thus it is possible to prevent the long-term parking counter Clp[i] from becoming equal to or greater than the threshold value Clpref. As a result, in Step S180, it is possible to more appropriately predict (determine) whether heavy-load traveling is to be performed within the predetermined time T2 after the start of a trip when a next trip is started at the predetermined target point P[i].

Figure 8:
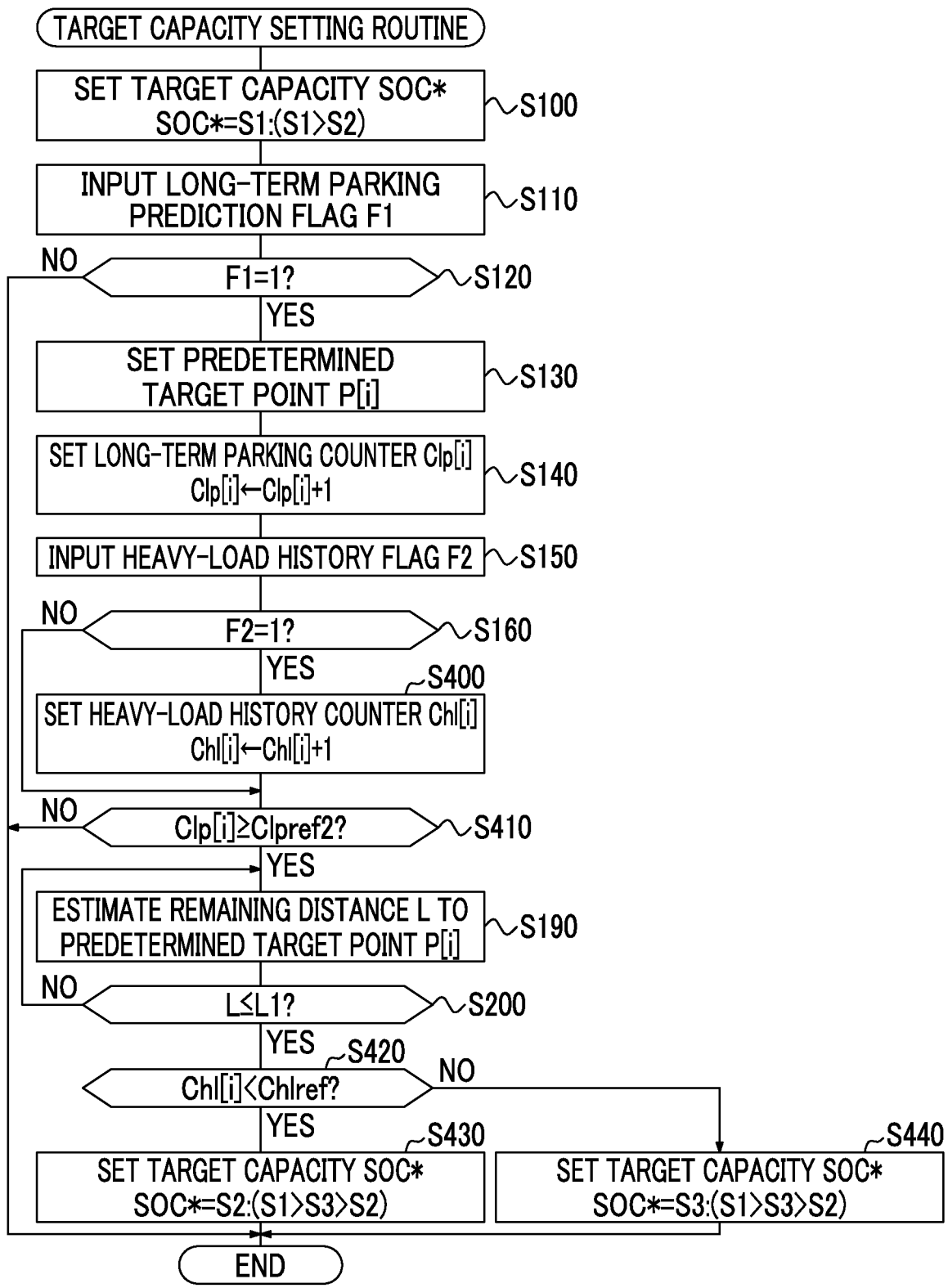
FIG. 8 is a flowchart illustrating an example of a target capacity setting routine according to a modified example.

In the hybrid vehicle 20 according to this embodiment, the HVECU 70 performs the target capacity setting routine illustrated in FIG. 3, but may perform a target capacity setting routine illustrated in FIG. 8 instead thereof. The target capacity setting routine illustrated in FIG. 8 is the same as the target capacity setting routine illustrated in FIG. 3, except that the processes of Steps S400 and S410 are performed instead of the processes of Steps S170 and S180 and the processes of Steps S420 to S440 are performed instead of the process of Step S200. Accordingly, the same processes will be referred to by the same step numbers and detailed description thereof will be omitted.

In the target capacity setting routine illustrated in FIG. 8, when it is determined in Step S160 that the heavy-load history flag F2 has a value of 1, the HVECU 70 determines that heavy-load traveling has been performed within the predetermined time T2 after the start of a trip in an immediately previous trip which has been started at the predetermined target point P[i] and increases a heavy-load history counter Chl[i] corresponding to the predetermined target point P[i] by 1 (Step S400). On the other hand, when it is determined in Step S160 that the heavy-load history flag F2 has a value of 0, the HVECU 70 determines that heavy-load traveling has not been performed within the predetermined time T2 after the start of the trip in the immediately previous trip which has been started at the predetermined target point P[i] and maintains the heavy-load history counter Chl[i] (the process of Step S400 is not performed). Here, the heavy-load history counter Chl[i] is set to a value of 0 as an initial value at the time of shipment or the like.

Subsequently, the HVECU 70 compares the long-term parking counter Clp[i] corresponding to the predetermined target point P[i] with a threshold value Clpref2 (Step S410). Here, the threshold value Clpref2 is a threshold value which is used to determine whether to permit execution of power storage capacity decreasing control in a current trip, and, for example, 3, 4, or 5 is used. As the threshold value Clpref2, the same value may be used for the predetermined points or different values may be used for the predetermined points.

When it is determined in Step S410 that the long-term parking counter Clp[i] corresponding to the predetermined target point P[i] is less than the threshold value Clpref2, the HVECU 70 determines that execution of power storage capacity decreasing control in the current trip is not permitted and ends this routine. In this case, the target capacity SOC* of the battery 50 is maintained at the predetermined value S1 until the current trip ends.

When it is determined in Step S410 that the long-term parking counter Clp[i] corresponding to the predetermined target point P[i] is equal to or greater than the threshold value Clpref2, the HVECU 70 determines that execution of power storage capacity decreasing control in the current trip is permitted, waits until the remaining distance L to the predetermined target point P[i] becomes equal to or less than the predetermined distance L1 (Steps S190 and S200), and compares the heavy-load history counter Chl[i] corresponding to the predetermined target point P[i] with a threshold value Chlref (Step S420). Here, similarly to the threshold value Clpref, the threshold value Chlref is a threshold value which is used to predict (determine) whether to perform heavy-load traveling within a predetermined time T2 after the start of a trip when a next trip is started at the predetermined target point P[i], and, for example, 3, 4 or 5 is used. As the threshold value Chlref, the same value may be used for the predetermined points, or different values may be used for the predetermined points.

When it is determined in Step S420 that the heavy-load history counter Chl[i] corresponding to the predetermined target point P[i] is less than the threshold value Chlref, the HVECU 70 predicts (determines) that heavy-load traveling is not performed within the predetermined time T2 after the start of a trip even when the next trip is started at the predetermined target point P[i], sets the target capacity SOC* of the battery 50 to the predetermined value S2 (Step S430), and ends this routine. In this case, the same power storage capacity decreasing control as in the embodiment is executed in the current trip. Accordingly, similarly to the embodiment, it is possible to achieve an improvement in energy efficiency.

When it is determined in Step S420 that the heavy-load history counter Chl[i] corresponding to the predetermined target point P[i] is equal to or greater than the threshold value Chlref, the HVECU 70 predicts (determines) that heavy-load traveling is performed within the predetermined time T2 after the start of a trip when the next trip is started at the predetermined target point P[i], sets the target capacity SOC* of the battery 50 to a predetermined value S3 which is less than the predetermined value S1 and greater than the predetermined value S2 (Step S440), and ends this routine. A substantially median value between the predetermined value S1 and the predetermined value S2, for example, 54%, 55%, or 56%, is used as the predetermined value S3. In this case, second power storage capacity decreasing control of limiting an amount of decreased power storage capacity SOC of the battery 50 compared with that in the power storage capacity decreasing control is executed in the current trip. The "second power storage capacity decreasing control" is specifically control of controlling the engine 22 or the motors MG1 and MG2 such that the power storage capacity SOC of the battery 50 gets close to the predetermined value S3.

Even when it is predicted that heavy-load traveling is performed within the predetermined time T2 after the start of a trip when a next trip is started at the predetermined target point P[i], it is only prediction and it is not sure whether heavy-load traveling is actually performed. Accordingly, through this control, it is possible to curb a decrease in traveling performance to a certain extent and to prevent a load on the engine 22 from increasing excessively for securing the traveling performance to decrease the efficiency of the engine 22 to a certain extent when heavy-load traveling is performed within the predetermined time T2 from (relatively after) the start of the next trip, in comparison with a case in which the power storage capacity decreasing control is executed in the current trip. On the other hand, when heavy-load traveling is not performed within the predetermined time T2 after the start of the next trip, it is possible to achieve an improvement in energy efficiency to a certain extent, in comparison with a case in which the power storage capacity decreasing control is not executed in the current trip.

Figure 9:
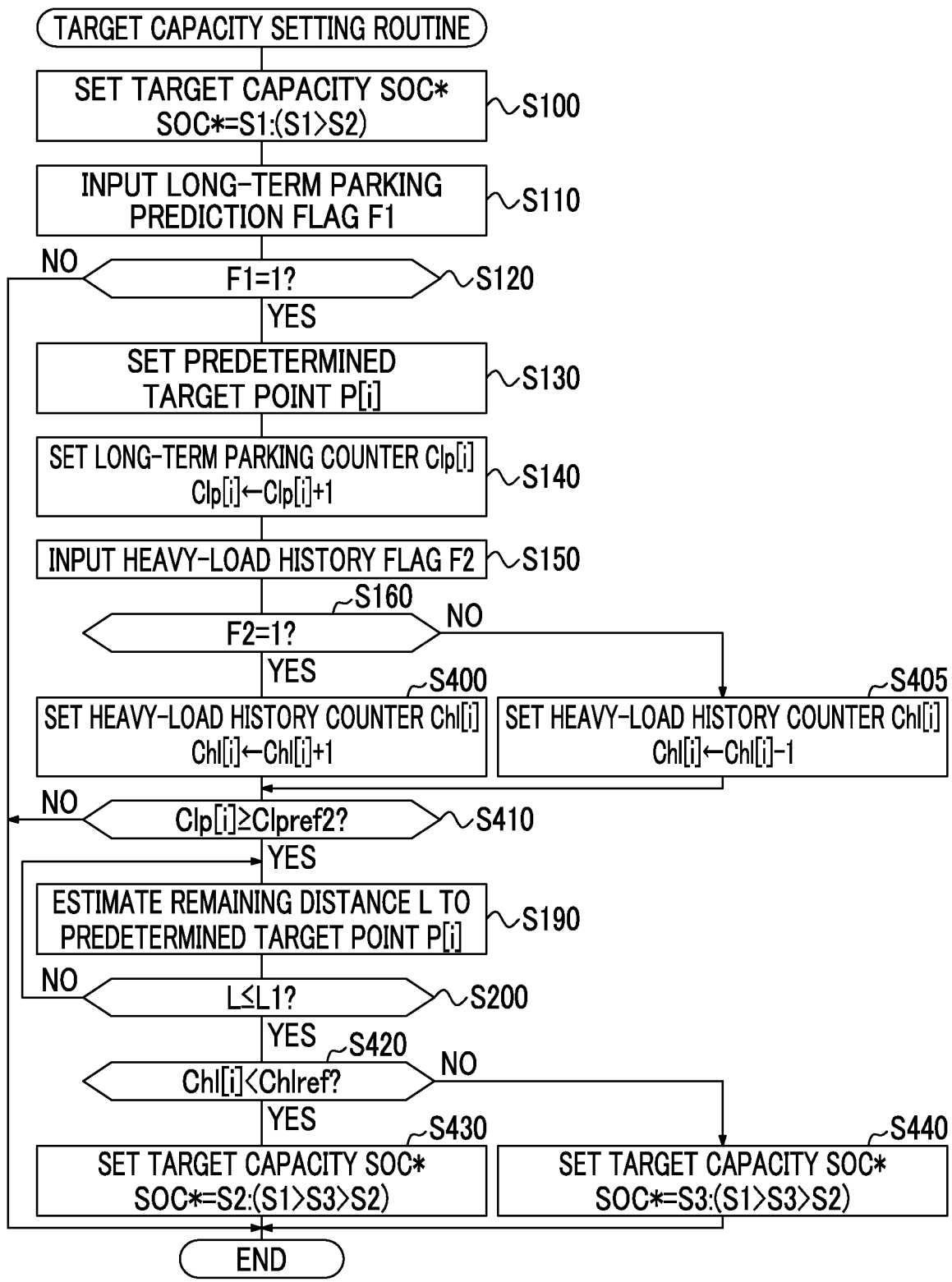
FIG. 9 is a flowchart illustrating an example of a target capacity setting routine according to a modified example.

In this modified example, the HVECU 70 performs the target capacity setting routine illustrated in FIG. 8, but may perform a target capacity setting routine illustrated in FIG. 9 instead thereof. The target capacity setting routine illustrated in FIG. 9 is the same as the target capacity setting routine illustrated in FIG. 8, except that the process of Step S405 is added. Accordingly, the same processes will be referred to by the same step numbers and detailed description thereof will be omitted.

In the target capacity setting routine illustrated in FIG. 9, when it is determined in Step S160 that the value of the heavy-load history flag F2 is 0, the HVECU 70 determines that heavy-load traveling has not been performed within the predetermined time T2 after the start of a trip in an immediately previous trip which has been started at the predetermined target point P[i], and decreases the heavy-load history counter Chl[i] by 1 (Step S405). Then, the processes of Step S410 and steps subsequent thereto are performed.

Accordingly, as the number of times of the frequency in which heavy-load traveling was performed within the predetermined time T2 after the start of a previous trip when the trip was started at the predetermined target point P[i] becomes larger, the long-term parking counter Clp[i] can be set to a smaller value and can be less likely to be equal to or greater than the threshold value Chlref. As a result, in Step S420, it is possible to more appropriately predict (determine) whether heavy-load traveling is to be performed within the predetermined time T2 after the start of a trip when a next trip is started at the predetermined target point P[i].

Figure 10:
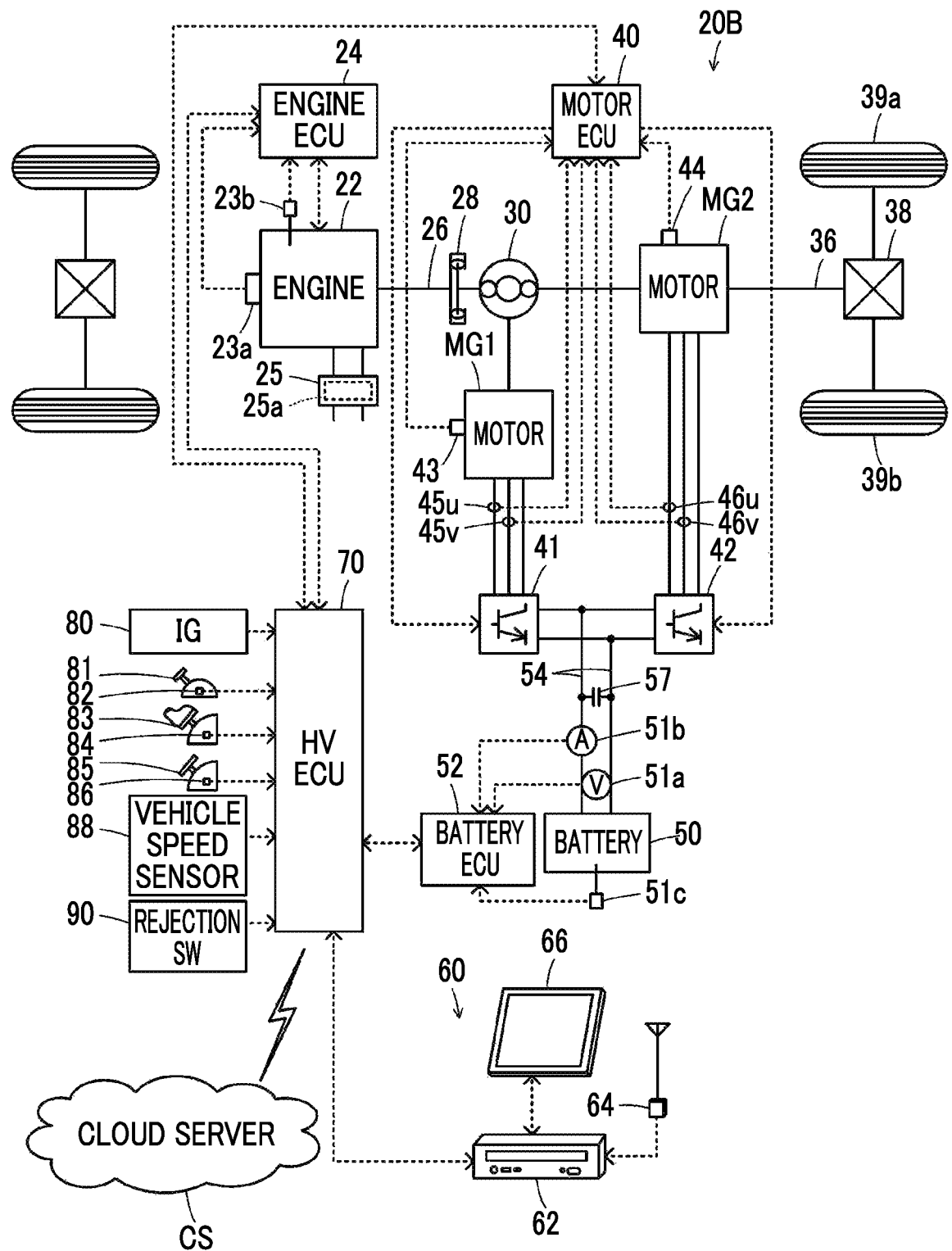
FIG. 10 is a diagram schematically illustrating a configuration of a hybrid vehicle 20B according to a modified example.

In the hybrid vehicle 20 according to the embodiment, although not particularly described, a rejection switch 90 that instructs to reject limiting (which includes prohibition) of execution of the power storage capacity decreasing control may be provided in addition to the configuration of the hybrid vehicle 20, as can be seen from a hybrid vehicle 20B according to a modified example illustrated in FIG. 10. In this case, a rejection signal from the rejection switch 90 is also input to the HVECU 70. In the configuration of the hybrid vehicle 20B, the HVECU 70 may perform a target capacity setting routine illustrated in FIG. 11 or 12 instead of the target capacity setting routine illustrated in FIG. 3 or 8. These routines will be sequentially described below.

Figure 11:
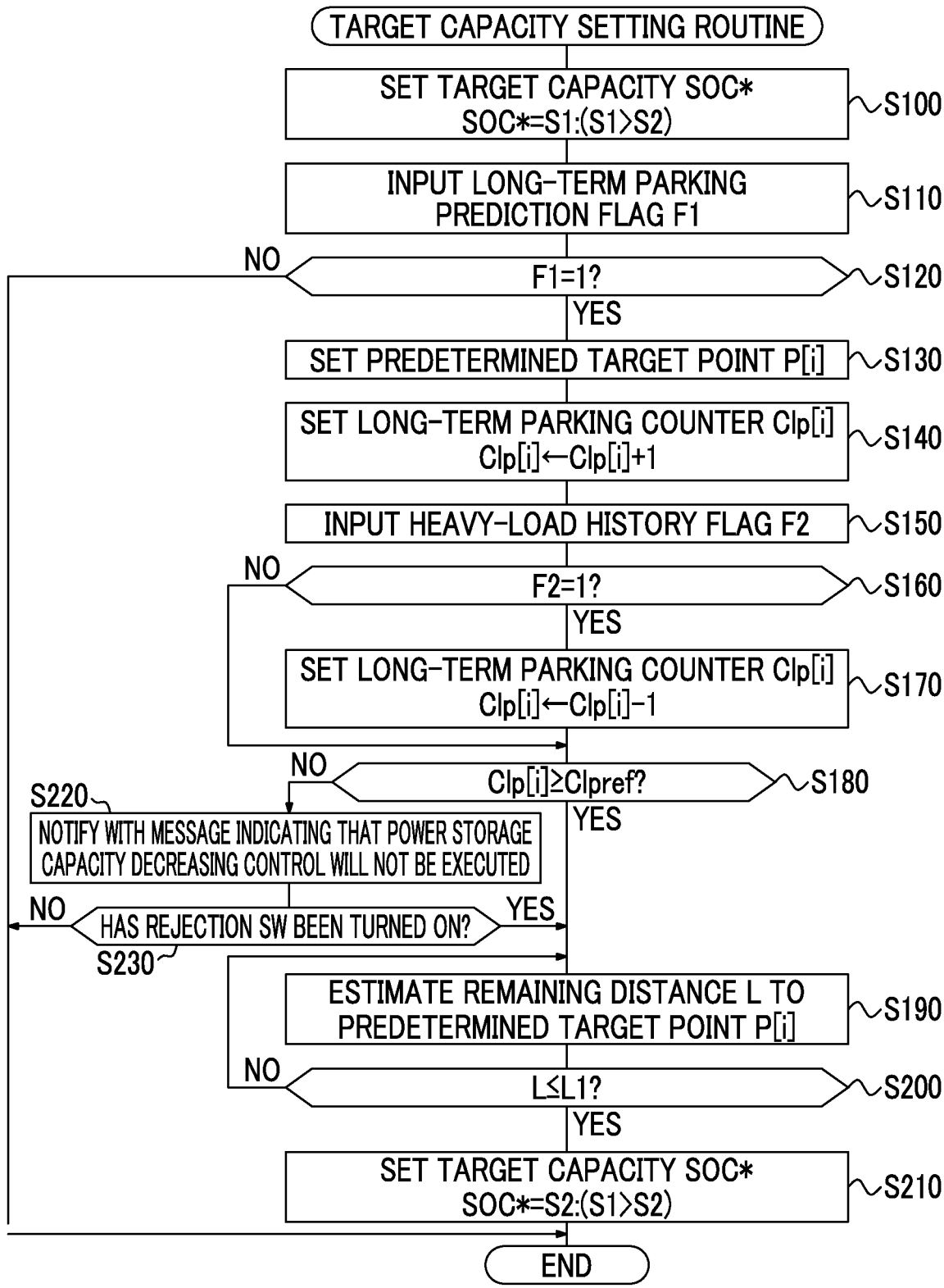
FIG. 11 is a flowchart illustrating an example of a target capacity setting routine according to a modified example.

The target capacity setting routine illustrated in FIG. 11 will be first described. The target capacity setting routine illustrated in FIG. 11 is the same as the target capacity setting routine illustrated in FIG. 3, except that the processes of Steps S220 and S230 are added. Accordingly, the same processes will be referred to by the same step numbers and detailed description thereof will be omitted.

In the target capacity setting routine illustrated in FIG. 11, when it is determined in Step S180 that the value of the long-term parking counter Clp[i] corresponding to the predetermined target point P[i] is less than the threshold value Clpref, the HVECU 70 predicts (determines) that heavy-load traveling is performed within the predetermined time T2 after the start of a trip when the next trip is started at the predetermined target point P[i], notifies a user of a message indicating that the power storage capacity decreasing control will not be executed by displaying the message on the display 66 or outputting sound indicating the message (Step S220), and checks whether the rejection switch 90 is turned on or off (Step S230). Then, when the rejection switch 90 is turned off, this routine ends. In this case, the power storage capacity decreasing control is not executed in the current trip.

When it is checked in Step S230 that the rejection switch 90 is turned on, the HVECU 70 performs the processes of Step S190 and steps subsequent thereto. In this case, the power storage capacity decreasing control is executed in the current trip. Through this control, when it is predicted that heavy-load traveling is performed within the predetermined time T2 after the start of a trip when a next trip is started at the predetermined target point P[i], but the rejection switch 90 is turned on, it is possible to reflect a user's intention and to execute the power storage capacity decreasing control in the current trip. Since a user is notified that a message indicating that the power storage capacity decreasing control will not be executed, the user can recognize the message and select whether to turn on the rejection switch 90.

Figure 12:
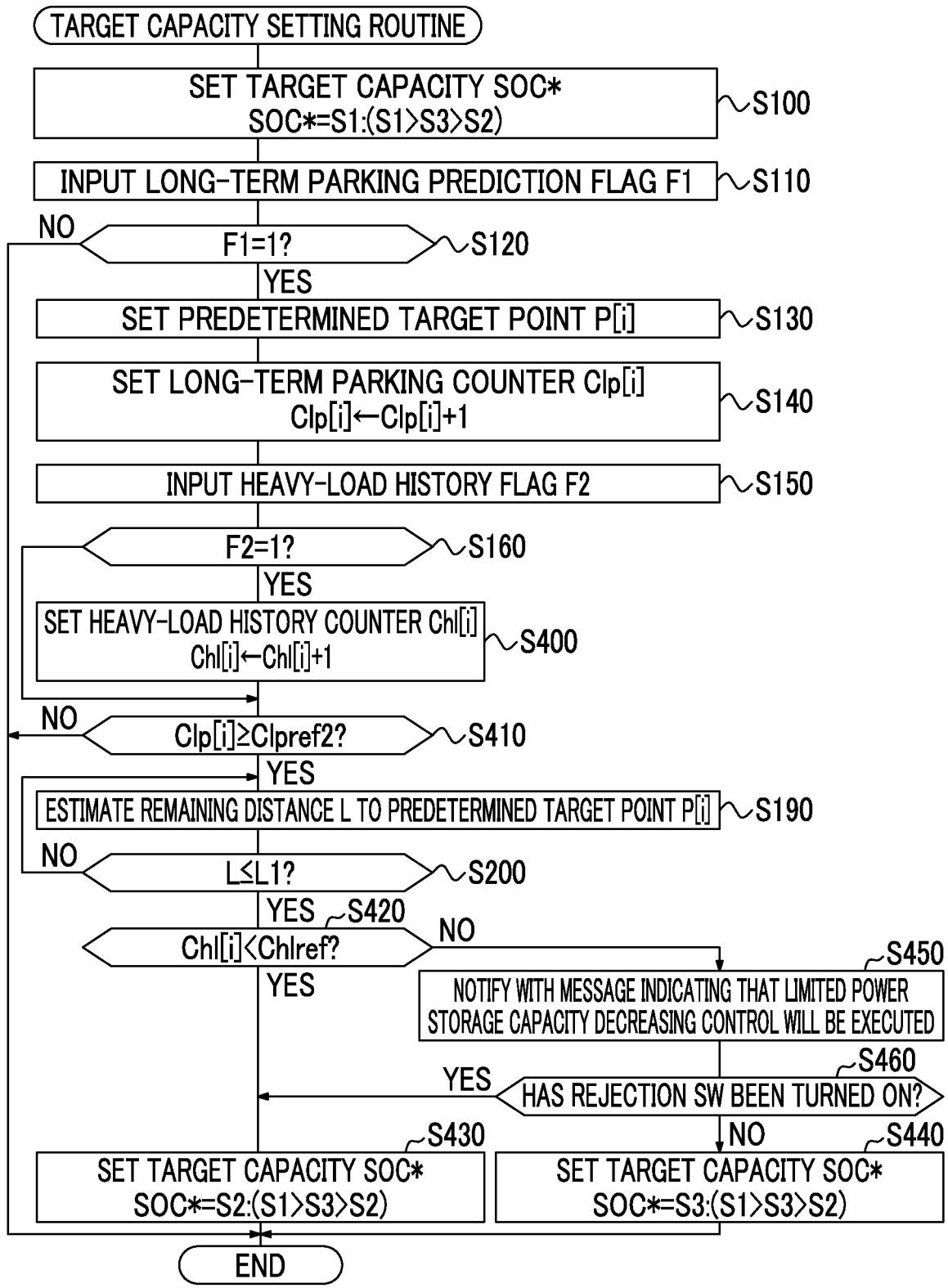
FIG. 12 is a flowchart illustrating an example of a target capacity setting routine according to a modified example.

The target capacity setting routine illustrated in FIG. 12 will be described. The target capacity setting routine illustrated in FIG. 12 is the same as the target capacity setting routine illustrated in FIG. 7, except that the processes of Steps S450 and S460 are added. Accordingly, the same processes will be referred to by the same step numbers and detailed description thereof will be omitted.

In the target capacity setting routine illustrated in FIG. 12, when it is determined in Step S420 that the value of the heavy-load history counter Chl[i] corresponding to the predetermined target point P[i] is equal to or greater than the threshold value Chlref, the HVECU 70 predicts (determines) that heavy-load traveling is performed within the predetermined time T2 after the start of a trip when the next trip is started at the predetermined target point P[i], notifies a user of a message indicating that the power storage capacity decreasing control will not be executed (the second power storage capacity decreasing control will be executed) by displaying the message on the display 66 or outputting sound indicating the message (Step S450), and checks whether the rejection switch 90 is turned on or off (Step S460). Then, when the rejection switch 90 is turned off, the HVECU 70 sets the target capacity SOC* of the battery 50 to the predetermined value S3 (Step S440) and ends this routine. In this case, the second power storage capacity decreasing control is executed in the current trip.

When it is checked in Step S460 that the rejection switch 90 is turned on, the HVECU 70 sets the target capacity SOC* of the battery 50 to the predetermined value S2 (Step S430) and ends this routine. In this case, the power storage capacity decreasing control is executed in the current trip. Through this control, when it is predicted that heavy-load traveling is performed within the predetermined time T2 after the start of a trip when a next trip is started at the predetermined target point P[i], but the rejection switch 90 is turned on, it is possible to reflect a user's intention and execute the power storage capacity decreasing control in the current trip. Since a user is notified of the message indicating that the second power storage capacity decreasing control will be executed, the user can recognize the message and select whether to turn on the rejection switch 90.

In the hybrid vehicle 20 according to the embodiment, as the power storage capacity decreasing control, the target capacity SOC* of the battery 50 is set to the predetermined value S2 which is less than the predetermined value S1 when the power storage capacity decreasing control is not executed. However, the disclosure is not limited to the target capacity SOC* of the battery 50, but a starting capacity SOCst as a starting power storage capacity SOC of the engine 22 for forcibly charging the battery 50 may be set to a value less than that when the power storage capacity decreasing control is not executed.

In the hybrid vehicle 20 according to the embodiment, as the power storage capacity decreasing control, the target capacity SOC* of the battery 50 is set to the predetermined value S2 which is less than the predetermined value S1 when the power storage capacity decreasing control is not executed. However, instead of or in addition to the power storage capacity decreasing control, a stopping threshold value Pstop or a starting threshold value Pstart may be set to a value greater than that when the power storage capacity decreasing control is not executed. As long as they are starting and stopping threshold values associated with a traveling output for the vehicle, the disclosure is not limited to the stopping threshold value Pstop or the starting threshold value Pstart for the required power Pe*, but starting and stopping threshold values for the accelerator operation amount Acc, starting and stopping threshold values for the vehicle speed V, starting and stopping threshold values for the required torque Td*, starting and stopping threshold values for the required power Pd*, starting and stopping threshold values for an actual torque Td of the drive shaft 36, starting and stopping threshold values for an actual power Pd of the drive shaft 36, starting and stopping threshold values for an actual power Pe of the engine 22, and the like may be set to values greater than those when the power storage capacity decreasing control is not executed as the power storage capacity decreasing control.

In the hybrid vehicle 20 according to the embodiment, the onboard navigation device 60 sets a destination, sets a scheduled traveling route from a current location of the vehicle to a destination, or performs route guidance for the scheduled traveling route. However, a mobile terminal (for example, a smartphone or a tablet) that can wirelessly communicate with the HVECU 70 may set a destination, set a scheduled traveling route from a current location of the vehicle to a destination, or perform route guidance for the scheduled traveling route. In this case, in the target capacity setting routine illustrated in FIG. 3, a destination may be input from the mobile terminal instead of inputting a destination from the onboard navigation device 60.

The hybrid vehicle 20 according to the embodiment includes the onboard navigation device 60, but may not include the onboard navigation device 60.

The hybrid vehicle 20 according to the embodiment is a vehicle that does not include a connector capable of being connected to an external power supply, that is, a vehicle which cannot be subjected to external charging which is charging of the battery 50 using electric power from the external power supply. However, the hybrid vehicle 20 may be a vehicle which can be subjected to external charging. In this case, it is preferable that a position at which external charging is not available be set (registered) as the predetermined position. This is because there is low necessity for power storage capacity decreasing control before long-term parking when the vehicle is subjected to external charging during long-term parking at the predetermined point.

In the hybrid vehicle 20 according to the embodiment, the battery 50 is used as a power storage device, but a capacitor may be used instead of the battery 50.

The hybrid vehicle 20 according to the embodiment includes the engine ECU 24, the motor ECU 40, the battery ECU 52, and the HVECU 70, but at least two thereof may be configured as a single electronic control unit.

Figure 13:
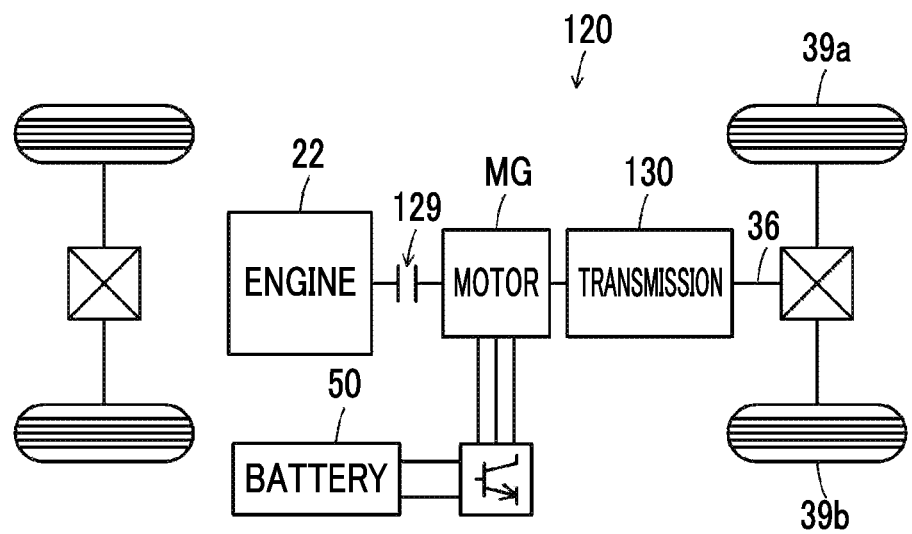
FIG. 13 is a diagram schematically illustrating a configuration of a hybrid vehicle 120 according to a modified example.
Figure 14:
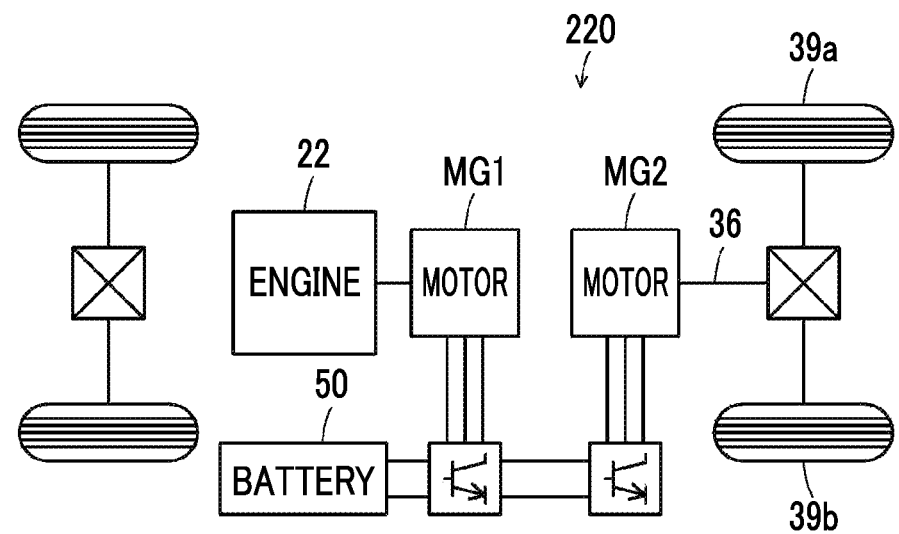
FIG. 14 is a diagram schematically illustrating a configuration of a hybrid vehicle 220 according to a modified example.

In the hybrid vehicle 20 according to the embodiment, a configuration in which the engine 22 and the motor MG1 are connected to the drive shaft 36 connected to the driving wheels 39a and 39b via the planetary gear 30, the motor MG2 is connected to the drive shaft 36, and the battery 50 is connected to the motors MG1 and MG2 via a power line has been employed. However, as can be seen from a hybrid vehicle 120 according to a modified example illustrated in FIG. 13, a configuration of a so-called single-motor hybrid vehicle in which a motor MG is connected to the drive shaft 36 connected to the driving wheels 39a and 39b via a transmission 130, the engine 22 is connected to the motor MG via a clutch 129, and the battery 50 is connected to the motor MG via a power line may be employed. As can be seen from a hybrid vehicle 220 according to a modified example illustrated in FIG. 14, a configuration of a so-called series hybrid vehicle in which a power-generating motor MG1 is connected to the engine 22, a traveling motor MG2 is connected to the drive shaft 36 connected to the driving wheels 39a and 39b, and the battery 50 is connected to the motors MG1 and MG2 via a power line may be employed.

In the embodiment, the disclosure is embodied as the hybrid vehicle 20, but may be embodied as a controller mounted in the hybrid vehicle 20. In this case, the HVECU 70, the engine ECU 24, the motor ECU 40, and the battery ECU 52 are an example of a "controller."

Correspondence between principal elements of the embodiment and principal elements of the disclosure described in the SUMMARY will be described below. In the embodiment, the engine 22 is an example of an "engine." The motor MG1 or the motor MG2 is an example of a "motor." The battery 50 is an example of a "power storage device." The HVECU 70, the engine ECU 24, the motor ECU 40, and the battery ECU 52 are examples of a "controller."

The correspondence between the principal elements in the embodiment and the principal elements of the disclosure described in the SUMMARY does not limit the elements of the disclosure described in the SUMMARY, because the embodiment is an example for specifically describing an aspect of the disclosure described in the SUMMARY. That is, it should be noted that the disclosure described in the SUMMARY has to be construed based on the description of the SUMMARY and the embodiment is only a specific example of the disclosure described in the SUMMARY.

While an embodiment of the disclosure has been described above, the disclosure is not limited to the embodiment and can be modified in various forms without departing from the gist of the disclosure.

The disclosure is applicable to industries for manufacturing hybrid vehicles and controllers mounted therein.

What is claimed is:

1. A hybrid vehicle comprising:
   an engine;
   a motor;
   a power storage device connected to the motor; and
   an electronic control unit configured to,
   i) when a condition a) is satisfied, execute power storage capacity decreasing control in a current trip and execute power storage capacity recovering control in a next trip, and
   ii) limit an amount of decreased power storage capacity of the power storage device compared with the power storage capacity decreasing control in the current trip when the condition a) and a condition b) are both satisfied,
      a) parking at a predetermined point is predicted, and
      b) when the next trip is started at the predetermined point, heavy-load traveling with a load heavier than a predetermined load is predicted to be performed within a predetermined period after a start of the next trip,
   the power storage capacity decreasing control being control of controlling the engine and the motor such that a power storage capacity of the power storage device is lower when the condition a) is satisfied than when the condition a) is not satisfied,
   the power storage capacity recovering control being control of controlling the engine and the motor such that the power storage capacity of the power storage device is recovered when the engine operates, and
   the predetermined period being at least one period of a period in which a predetermined time elapses and a period in which the hybrid vehicle travels a predetermined distance.

2. The hybrid vehicle according to claim 1, wherein the electronic control unit is configured to prohibit execution of the power storage capacity decreasing control in the current trip when the condition a) and the condition b) are both satisfied.

3. The hybrid vehicle according to claim 1, wherein the electronic control unit is configured to predict whether to perform the heavy-load traveling within the predetermined period after the start of the next trip at the predetermined point based on one of a condition c) and a condition d) when the condition a) is satisfied,
   c) the number of times the heavy-load traveling was performed within the predetermined period after the start of a previous trip when the previous trip was started at the predetermined point; and
   d) the number of times the heavy-load traveling was not performed within the predetermined period after the start of the previous trip when the previous trip was started at the predetermined point.

4. The hybrid vehicle according to claim 3, wherein the electronic control unit is configured to determine whether the heavy-load traveling was performed within the predetermined period after the start of the trip based on at least one of a condition e), f a condition), a condition g), a condition h), and a condition j):
   e) one of an integrated value of an accelerator operation amount within the predetermined period after the start of the trip and a maximum value of the accelerator operation amount within the predetermined period after the start of the trip;
   f) one of an integrated value of a vehicle speed within the predetermined period after the start of the trip and a maximum value of the vehicle speed within the predetermined period after the start of the trip;
   g) one of an integrated value of a traveling output within the predetermined period after the start of the trip and a maximum value of the traveling output within the predetermined period after the start of the trip;

h) one of an integrated value of a road gradient within the predetermined period after the start of the trip and a maximum value of the road gradient within the predetermined period after the start of the trip; and j) a difference in elevation within the predetermined period after the start of the trip.

5. The hybrid vehicle according to claim 1, wherein the electronic control unit is configured to predict whether to perform the heavy-load traveling within the predetermined period after the start of the next trip at the predetermined point based on at least one of presence of an uphill road, a road gradient, and a difference in elevation within the predetermined distance from the predetermined point when the condition a) is satisfied.

6. The hybrid vehicle according to claim 1, wherein the electronic control unit is configured to notify with a message indicating limiting of execution of the power storage capacity decreasing control when a condition k) is satisfied, k) execution of the power storage capacity decreasing control is scheduled to be limited.

7. The hybrid vehicle according to claim 1, wherein the electronic control unit is configured not to limit execution of the power storage capacity decreasing control in the current trip when the condition k) and a condition l) are both satisfied, l) rejection of limiting of execution of the power storage capacity decreasing control is instructed.

8. The hybrid vehicle according to claim 1, wherein the electronic control unit is configured to determine whether parking at the predetermined point is predicted based on whether a destination is the predetermined point, and the electronic control unit is configured to acquire the destination that is predicted based on a traveling history by an external system when the destination has not been set by a user.

9. The hybrid vehicle according to claim 1, wherein the hybrid vehicle is a vehicle that is not able to use external charging, the external charging is charging of the power storage device using electric power from an external power supply.

10. The hybrid vehicle according to claim 1, wherein the hybrid vehicle is a vehicle that is able to use external charging, the external charging is charging of the power storage device using electric power from an external power supply, the predetermined point being a position at which the vehicle is predicted not to use the external charging.

11. A controller for a hybrid vehicle,
the hybrid vehicle including an engine, a motor, and a power storage device that is connected to the motor,
the controller comprising:
an electronic control unit configured to,
i) when a condition a) is satisfied, execute power storage capacity decreasing control in a current trip and execute power storage capacity recovering control in a next trip, and
ii) limit an amount of decreased power storage capacity of the power storage device compared with the power storage capacity decreasing control in the current trip when the condition a) and a condition b) are both satisfied,
a) parking at a predetermined point is predicted, and
b) when the next trip is started at the predetermined point, heavy-load traveling with a load heavier than a predetermined load is predicted to be performed within a predetermined period after a start of the next trip,
the power storage capacity decreasing control being control of controlling the engine and the motor such that a power storage capacity of the power storage device is lower when the condition a) is satisfied than when the condition a) is not satisfied,
the power storage capacity recovering control being control of controlling the engine and the motor such that the power storage capacity of the power storage device is recovered when the engine operates, and
the predetermined period being at least one period of a period in which a predetermined time elapses and a period in which the hybrid vehicle travels a predetermined distance.

12. A control method for a hybrid vehicle,
the hybrid vehicle including an engine, a motor, a power storage device that is connected to the motor, and an electronic control unit,
the control method comprising:
i) when a condition a) is satisfied, executing, by the electronic control unit, power storage capacity decreasing control in a current trip and executing, by the electronic control unit, power storage capacity recovering control in a next trip, and
ii) limiting, by the electronic control unit, an amountof decreased power storage capacity of the power storage device compared with the power storage capacity decreasing control in the current trip when the condition a) and a condition b) are both satisfied,
a) parking at a predetermined point is predicted, and
b) when the next trip is started at the predetermined point, heavy-load traveling with a load heavier than a predetermined load is predicted to be performed within a predetermined period after a start of the next trip,
the power storage capacity decreasing control is control of controlling the engine and the motor such that a power storage capacity of the power storage device is lower when the condition a) is satisfied than when the condition a) is not satisfied,
the power storage capacity recovering control is control of controlling the engine and the motor such that the power storage capacity of the power storage device is recovered when the engine operates, and
the predetermined period is at least one period of a period in which a predetermined time elapses and a period in which the hybrid vehicle travels a predetermined distance.

13. The hybrid vehicle according to claim 1, wherein the electronic control unit is configured to:
reduce the power storage capacity of the power storage device to a first predetermined value based on the condition a) being satisfied; and
reduce the power storage capacity of the power storage device to a second predetermined value, that is greater than the first predetermined value, based on the condition a) being satisfied and the condition b) being satisfied.

14. The hybrid vehicle according to claim 1, wherein the electronic control unit is configured to determine whether the heavy-load traveling was performed within the predetermined period based on a value detected by an accelerator pedal position sensor or a vehicle speed sensor.

* * * * *